United States Patent
Yoon

(10) Patent No.: US 10,914,485 B2
(45) Date of Patent: Feb. 9, 2021

(54) METHOD FOR CONTROLLING AIR CONDITIONER SYSTEM

(71) Applicant: LG ELECTRONICS INC., Seoul (KR)

(72) Inventor: Seontae Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 244 days.

(21) Appl. No.: 16/144,215

(22) Filed: Sep. 27, 2018

(65) Prior Publication Data

US 2019/0101304 A1 Apr. 4, 2019

(30) Foreign Application Priority Data

Sep. 29, 2017 (KR) .................. 10-2017-0128053

(51) Int. Cl.
*F24F 11/50* (2018.01)
*F24F 1/0003* (2019.01)
(Continued)

(52) U.S. Cl.
CPC ............ *F24F 11/50* (2018.01); *F24F 1/0003* (2013.01); *F24F 11/30* (2018.01); *F24F 11/58* (2018.01);
(Continued)

(58) Field of Classification Search
CPC .......... F24F 11/50; F24F 1/0003; F24F 11/62; F24F 11/58; F24F 11/88; F24F 11/30;
(Continued)

(56) References Cited

U.S. PATENT DOCUMENTS

2004/0261432 A1* 12/2004 Yamamoto ............... F24F 11/30
62/132
2016/0327304 A1 11/2016 Tsuji et al.
(Continued)

FOREIGN PATENT DOCUMENTS

KR 10-2004-0093638 11/2004
KR 10-2004-0093639 11/2004
(Continued)

OTHER PUBLICATIONS

European Search Report dated Jan. 25, 2019 issued in Application No. 18197250.6.
(Continued)

*Primary Examiner* — Shaima Q Aminzay
(74) *Attorney, Agent, or Firm* — KED & Associates LLP

(57) ABSTRACT

A method of controlling an air conditioner system, the method including transmitting, by a first unit among a plurality of units belonging to a particular group, a wireless tuning command to a second unit; measuring, by the second unit, reception sensitivity and a transmission and reception success rate by wirelessly communicating with units belonging to the particular group while reducing a signal strength from a default signal strength; when the reception sensitivity and the transmission and reception success rate satisfy the predetermined standard, determining, by the second unit, that the signal strength corresponding to a level right before a level satisfying a predetermined standard is the signal strength to be used; and transmitting, by the second unit, information related to the determined signal strength to the first unit. Accordingly, an optimal signal strength at which mutual interference is prevented may be set.

8 Claims, 10 Drawing Sheets

(51) Int. Cl.
*H04W 52/24* (2009.01)
*G08C 17/02* (2006.01)
*F24F 11/62* (2018.01)
*F24F 11/58* (2018.01)
*H04B 17/318* (2015.01)
*F24F 11/88* (2018.01)
*F24F 11/30* (2018.01)
*F24F 110/20* (2018.01)
*F24F 110/70* (2018.01)
*F24F 110/76* (2018.01)
*F24F 110/40* (2018.01)
*F24F 110/10* (2018.01)

(52) U.S. Cl.
CPC .............. *F24F 11/62* (2018.01); *F24F 11/88* (2018.01); *G08C 17/02* (2013.01); *H04B 17/318* (2015.01); *H04W 52/245* (2013.01); *F24F 2110/10* (2018.01); *F24F 2110/20* (2018.01); *F24F 2110/40* (2018.01); *F24F 2110/70* (2018.01); *F24F 2110/76* (2018.01)

(58) Field of Classification Search
CPC ............... F24F 2110/20; F24F 2110/70; F24F 2110/76; F24F 2110/40; F24F 2110/10; F24F 13/04; F24F 13/06; F24F 1/0011; H04W 52/245; G08C 17/02; H04B 17/318
USPC ........................................................ 455/507
See application file for complete search history.

(56) References Cited

U.S. PATENT DOCUMENTS

2018/0212462 A1  7/2018  Okino et al.
2018/0338290 A1  11/2018  Tashiro et al.

FOREIGN PATENT DOCUMENTS

| KR | 10-2007-0065708 | 6/2007 |
| KR | 10-2014-0131751 | 11/2014 |
| WO | WO 2017/018395 | 2/2017 |
| WO | WO 2017/135164 | 8/2017 |

OTHER PUBLICATIONS

Korean Office Action dated Feb. 7, 2019 issued in Application No. 10-2017-0128053.

* cited by examiner

METHOD FOR CONTROLLING AIR CONDITIONER SYSTEM

CROSS-REFERENCE TO RELATED APPLICATION(S)

This application claims the priority benefit of Korean Patent Application No. 10-2017-0128053, filed on Sep. 29, 2017 in the Korean Intellectual Property Office, the disclosure of which is incorporated herein by reference.

1. FIELD

An air conditioning system and a method for controlling an air conditioner system is disclosed herein.

2. BACKGROUND

An air conditioner may provide a comfortable and pleasant indoor environment to humans by discharging cold air to a room to adjust an indoor temperature and purify air of the room. The air conditioner may include an indoor unit including a heat exchanger or an indoor heat exchanger, which may be installed in a room. The air conditioner may also include an outdoor unit including a compressor and a heat exchanger or an outdoor heat exchanger, for example, and the outdoor unit may supply a refrigerant to the indoor unit.

The air conditioner, in which the indoor unit and the outdoor unit are separately controlled, may be operated by controlling power supplied to the compressor or the heat exchangers. The outdoor unit and the indoor unit may be connected by a refrigerant pipe. Compressed refrigerant from the compressor of the outdoor unit may be supplied to the indoor heat exchanger through the refrigerant pipe. Heat-exchanged refrigerant in the indoor heat exchanger may flow back into the compressor of the outdoor unit through the refrigerant pipe. As a result, the indoor unit may discharge the cold or hot air into the room via a heat exchange using the refrigerant.

Air conditioners may be interconnected between buildings or interconnected in small groups. An air conditioner system or an air conditioning system may transmit and receive data, and monitor a condition of the corresponding air conditioners based on the transmitted and received data. Recently, more attempts have been made to provide wireless communication between units, so there are increasing cases in which a wireless network is configured between not just units, such as an indoor unit, an outdoor unit, a controller, for example, but also other devices, such as a mobile terminal.

Due to wireless communication, it is possible to check information of devices and to control such devices without limiting the locations of a user and the devices. However, an increase in the use of wireless connected devices may lead to interference between devices positioned in a neighborhood or localized area.

Thus, there is need for a method of optimizing signal strength and a wireless communication range where mutual interference between wirelessly connected units may be prevented.

BRIEF DESCRIPTION OF THE DRAWINGS

The embodiments will be described in detail with reference to the following drawings in which like reference numerals refer to like elements, and wherein.

DETAILED DESCRIPTION

Figure 1:
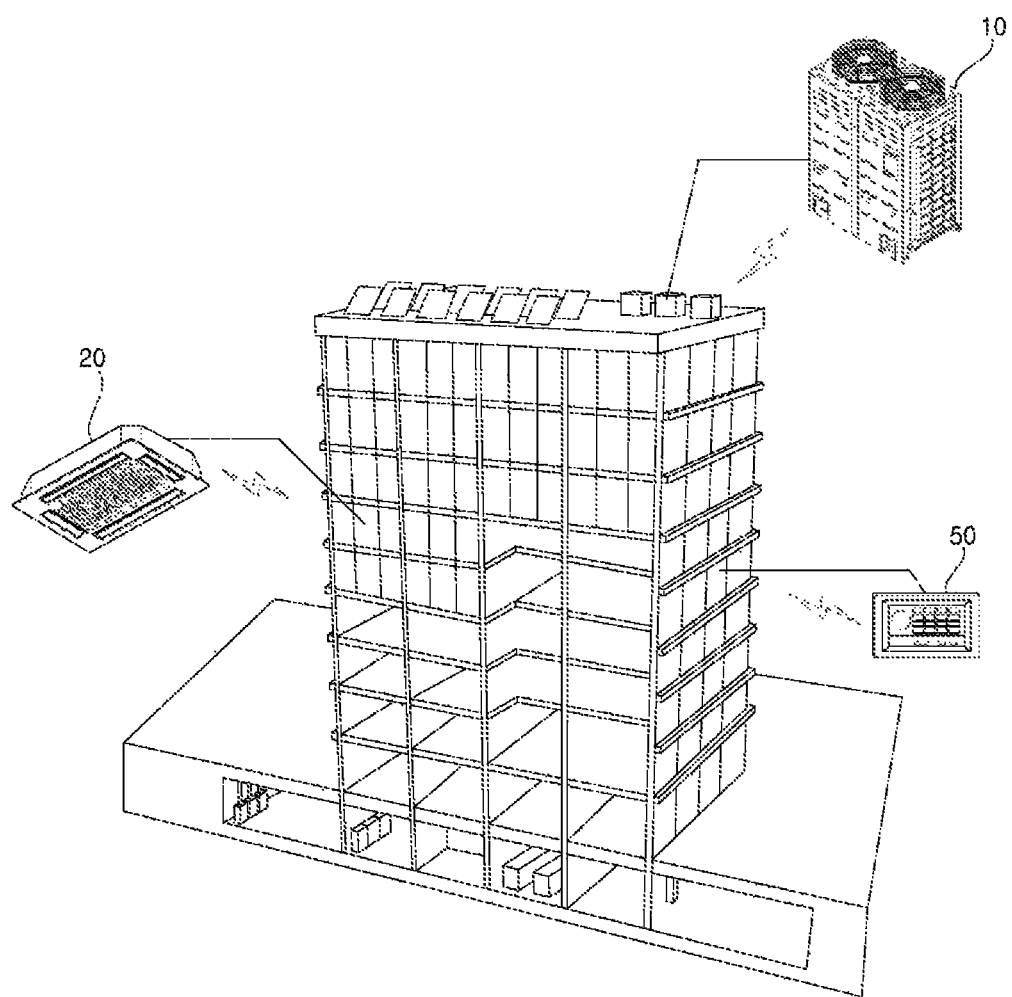
FIG. 1 is a diagram schematically illustrating a configuration in which an air conditioner system according to an embodiment is installed in a building.

Hereinafter, embodiments disclosed herein will be described in detail with reference to the accompanying drawings. While the embodiments will be described in conjunction with embodiments, it will be understood that the description is not intended to limit the embodiments to the embodiments.

In the drawings, in order to clearly and briefly describe the embodiments, components which are not related to the description will be omitted, and like reference numerals refer to like elements throughout.

In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. The word "unit" may also refer to a device or an assembly.

FIG. 1 is a diagram schematically illustrating a configuration in which an air conditioner system according to an embodiment is installed in a building. Referring to FIG. 1, an air conditioner system may include an outdoor unit 10, an indoor unit 20, and a controller 50. In addition to the indoor unit 20 and the outdoor unit 10, the air conditioner system may include a ventilator, an air purifier, a humidifier, or a heater, for example, and may further include other units or devices, such as a chiller, an air conditioning unit, and a cooling tower, depending on a size of the air conditioner system. In addition, the air conditioner system may be operatively connected to a mobile device, a security device, or an alarm device, for example located in the building.

The controller 50 may control an operation of the indoor unit 20 and the outdoor unit 10 in accordance with an input user command, may periodically receive and store data of corresponding operation states of the indoor unit and the outdoor unit, and may output the operation states through a monitor screen. The controller 50 may perform operation setting, lock setting, schedule control, group control, peak control regarding power consumption, or demand control, for example, of the indoor unit 20.

The outdoor unit 10 may be connected to the indoor unit 20 to supply refrigerant to the indoor unit 20. In addition, the outdoor unit 10 may periodically communicate with a plurality of indoor units 20 such that the outdoor unit 10 may transmit and/or receive data with respect to the plurality of indoor units 20, and may change an operation based on an operating setting changed through an indoor unit.

The indoor unit 20 may include an electronic expansion valve that expands refrigerant supplied from the outdoor unit 10, an indoor heat exchanger that heat-exchanges refrigerant, an indoor unit fan or indoor fan, a plurality of sensors, and a control means or indoor controller that controls an operation of the indoor unit. The indoor fan may allow indoor air to flow into the indoor heat exchanger and may allow heat-exchanged air to be exposed to an indoor room or an interior of a building The indoor unit 20 may further include a discharge port or outlet that discharges the heat-exchanged air. The discharge port may be provided with a wind direction adjusting means, vane, louver, or vent that may close the discharge port and control a direction of the discharged air. The indoor unit 20 may control the rotating speed of the indoor fan, thereby controlling intake air and air to be discharged and controlling an air flow rate. The indoor unit 20 may further include an output unit, output, or display that displays an operation state and setting data or input data of the indoor unit, and an input unit or input where a user may input the setting data or the input data. The indoor unit 20 may transmit the input data regarding air conditioner operation to a remote controller connected thereto, output the input data via the remote controller, and receive data.

The remote controller may be connected to the indoor unit via wired communication or wireless communication to input a user command to the indoor unit, receive data of the indoor unit, and output the received data. According to a method of connection with the indoor unit, the remote controller may transmit the user command to the indoor unit and perform one-directional communication in which data on the indoor unit is not received, or perform bidirectional communication in which data is both transmitted and received with respect to the indoor unit.

The outdoor unit 10 may operate in a cooling mode or a heating mode in response to data received from the indoor unit 20 or a control command received from the controller, and may supply refrigerant to the indoor unit. In the presence of a plurality of outdoor units, each outdoor unit may be connected to a plurality of indoor units, and the plurality of indoor units may supply refrigerant to the plurality of indoor units via a distributor.

The outdoor unit 10 may include at least one compressor that compresses the refrigerant and discharges a pressurized gas refrigerant, an accumulator that separates gas refrigerant and liquid refrigerant from the refrigerant to prevent non-vaporized liquid refrigerant from entering the compressor, an oil collection unit or an oil collector that collects oil from the refrigerant discharged from the compressor, an outdoor heat exchanger that condensed or evaporates the refrigerant via heat exchange with the outside air, an outdoor unit fan or outdoor fan, a four-way valve that changes the refrigerant flow path according to an operation mode of the outdoor unit, at least one pressure sensor that measures pressure, at least one temperature sensor that measures temperature, and a control unit or outdoor controller that controls an operation of the outdoor unit and communicates with other units or devices. The outdoor fan may introduce air into the outdoor heat exchanger in order to facilitate the heat exchange of the outdoor heat exchanger, and may discharge the heat-exchanged air to an outside of the air conditioner. The outdoor unit 10 may further include a plurality of sensors, valves, and super-coolers, for example, but description thereof may be omitted below.

In addition, the air conditioner system may transmit and receive data with respect to another air conditioner via a network connection such as the Internet. An air conditioner may access an external service center, a management server, or a database, for example, via the controller, and may communicate with an external terminal via a network. The terminal may access at least one unit or device in the air conditioner system, and monitor and control an operation of the air conditioner system as a second controller.

In addition, the outdoor unit 10, the indoor unit 20, and the controller 50 may wirelessly communicate directly with each other via a specific or predetermined wireless communication method, and the outdoor unit 10, the indoor unit 20, and the controller 50 may wirelessly communicate directly with a mobile terminal 200 via the specific or predetermined wireless communication method. A user may therefore be able to conveniently monitor a state of each unit or device using the mobile terminal 200, and control each unit. That is, the user may control the outdoor unit 10, the indoor unit 20, and/or the controller 50 via the mobile terminal 200.

Figure 2:
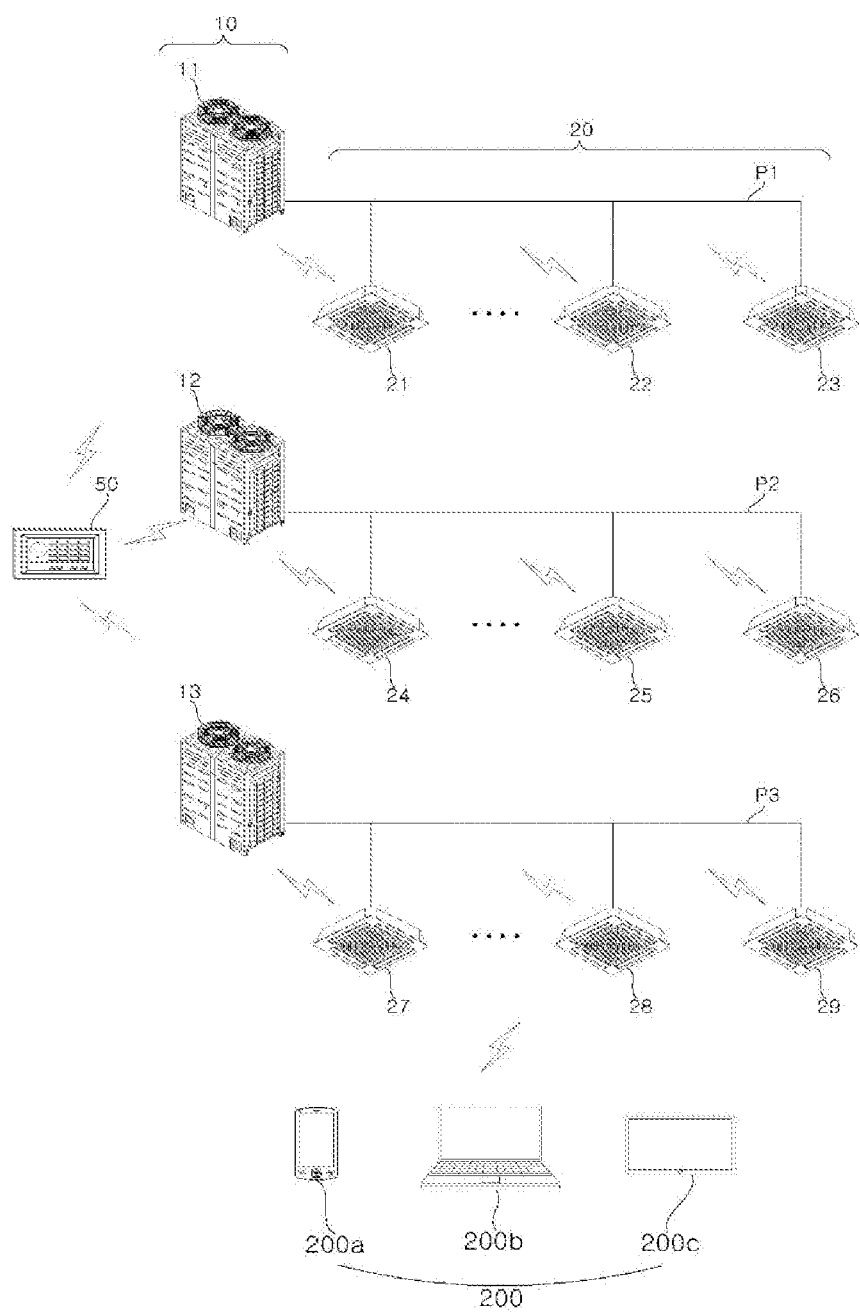
FIG. 2 is a diagram illustrating a configuration of an air conditioner system according to an embodiment.

FIG. 2 is a diagram illustrating a configuration of an air conditioner system according to an embodiment. Referring to FIG. 2, an indoor unit 20, an outdoor unit 10, and a controller 50 may transmit and receive data via a wireless communication method in the air conditioner system. The indoor unit 20 may include a plurality of indoor units 20. The plurality of indoor units 20 may include first indoor unit 21, second indoor unit 22, and third indoor unit 23, for example. The plurality of indoor units 20 may further include fourth, fifth, sixth, seventh, eighth, and ninth indoor units 24-29, for example. The outdoor unit 10 may include a plurality of outdoor units 10. The plurality of outdoor units 10 may include first outdoor unit 11, second outdoor unit 12, and third outdoor unit 13, for example. The plurality of outdoor units 10 may be connected to the plurality of indoor units 20 via refrigerant pipes P1, P2, and P3, and may transmit and receive data with respect to the plurality of indoor units 20 via a wireless communication method. Each outdoor unit of the plurality of outdoor units 10 may communicate with a plurality of indoor units 20. For example, first outdoor unit 11 may communicate with first, second, and third indoor units 21, 22, and 23 in the plurality of indoor units 20.

By periodically or repeatedly communicating with the plurality of indoor units 20, the plurality of outdoor units 10 may transmit and receive data with respect to the indoor units 20 and change an operation according to a change of operation setting or operation input of the indoor units 20. The plurality of outdoor units 10 and the plurality of indoor units 20 may transmit and receive data via a wireless communication method.

The plurality of indoor units 20 may communicate with the outdoor units 10, and also may communicate with the controller 50 via a wireless communication method. The first outdoor unit 11 may be connected to the first, second, and third indoor units 21, 22, and 23 via a first refrigerant pipe P1; the second outdoor unit 12 may be connected to the fourth, fifth, and sixth indoor units 24, 25, and 26 via a second refrigerant pipe P2; and the third outdoor unit 13 may be connected to the seventh, eighth, and ninth indoor units 27, 28, and 29 via a third refrigerant pipe P3. Each outdoor unit of the plurality of outdoor units 10 may be described as being connected to three indoor units of the plurality of indoor units 20, but it is merely exemplary and there is no limitation on the number or shape of indoor units. That is, the first, second, and third outdoor units 11, 12, and 13 may each be connected to more than three indoor units in the plurality of indoor units 20.

Refrigerant may be supplied to the first, second, and third indoor units 21, 22, and 23 from the first outdoor unit 11 upon operation of the first outdoor unit 11; refrigerant may be supplied to the fourth, fifth, and sixth indoor units 24, 25, and 26 via the second refrigerant pipe P2 from the second outdoor unit 12 upon operation of the second outdoor unit 12; and refrigerant may be supplied to the seventh, eighth, and ninth indoor units 27, 28, and 29 from the third outdoor unit 13 via the third refrigerant pipe P3 upon operation of the third outdoor unit 13.

Air conditioners may be grouped by an outdoor unit of the plurality of outdoor units 10, and each group of air conditioners may communicate using a different channel. An indoor unit in the plurality of indoor units 20 may perform a heat exchange using refrigerant supplied from an outdoor unit in the plurality of outdoor units 10 and may discharge cold or hot air, and thus, the indoor units of the plurality of indoor units 20 and the outdoor units of the plurality of outdoor units 10 connected via a refrigerant pipe may be set as one group.

For example, the first outdoor unit 11 may form a first group with the first, second, and third indoor units 21, 22, and 23 connected thereto via the first refrigerant pipe P1; the second outdoor unit 12 may form a second group with the fourth, fifth, and sixth indoor units 24, 25, and 26 connected thereto via the second refrigerant pipe P2; and the third outdoor unit 13 may form a third group with the seventh, eighth, and ninth indoor units 27, 28, and 29 connected thereto via the third refrigerant pipe P3. An outdoor unit of the plurality of outdoor units 10 and a controller 50 may form a group according to where they are installed. A state of connection via a refrigerant pipe, such as first, second, or third refrigerant pipes P1, P2, or P3, may be distinguished based on whether there is a change in temperature of an indoor unit in the plurality of indoor units 20 via a supply of refrigerant from an outdoor unit in the plurality of outdoor units 10 when the outdoor unit and the indoor unit are operated.

The controller 50 may communicate with the plurality of indoor units 20 or the plurality of outdoor units 10, regardless of a group. The controller 50 may control an operation of the plurality of indoor units 20 and the plurality of outdoor units 10. In response to an input user command, the controller 50 may periodically receive and store data of a corresponding operation of the plurality of indoor units 20 and the plurality of outdoor units 10, and may output an operation state through a monitor screen.

The controller 50 may be connected to the plurality of indoor units 20 to perform operation setting, lock setting, schedule control, group control, peak control regarding power consumption, demand control, for example. In addition, by communicating with the plurality of outdoor units 10, the controller 50 may control the plurality of outdoor units 10 and may monitor an operation of the plurality of outdoor units 10.

In the case where the controller 50 may be implemented as a plurality of controllers, the plurality of controllers 50 may transmit and receive data with each other through mutual wireless communication and may be connected to an external controller via a specific or predetermined network. When a controller 50 and a plurality of indoor units 20 and a plurality of outdoor units 10 transmit and receive data by a wireless communication method, addresses or address information necessary for the communication may be stored in the controller 50 and each unit of the plurality of indoor and outdoor units 20 and 10. Each address may be allocated by an outdoor unit of the plurality of outdoor units 10 and the controller 50.

An outdoor unit of the plurality of outdoor units 10 may be grouped with a plurality of indoor units 20 connected thereto via a refrigerant pipe, such as first, second, or third refrigerant pipes P1, P2, or P3. In this case, addresses may be allocated to the outdoor unit of the plurality of outdoor units 10 and the plurality of indoor units 20 belonging to the same group of the outdoor unit. In addition, even though a group is set with reference to one outdoor unit in the plurality of outdoor units 10, communication may be possible between every outdoor unit of the plurality of outdoor units 10 and every indoor unit of the plurality of indoor units 20. Accordingly, the controller 50 may allocate addresses to centrally control the outdoor and indoor units 10, 20 and to provide addresses for communication on a group basis. In some cases, the controller 50 may use the addresses allocated to an outdoor unit of the plurality of outdoor units 10 and indoor units of the plurality of indoor units 20 as addresses used in the central control, without allocating additional addresses. Each unit or device of the air conditioner system, such as the outdoor units of the plurality of outdoor units 10, the indoor units of the plurality of indoor units 20, and the controller 50 may wirelessly communicate with a mobile terminal 200.

Referring to FIG. 2, the air conditioner system according to an embodiment may further include the mobile terminal 200, which is enabled or configured to check a condition of an electronic device, such as the outdoor units of the plurality of outdoor units 10, the indoor units of the plurality of indoor units 20, and the controller 50, and a condition of an electronic device in the system. The mobile terminal 200 may be provided to control the air conditioner system, and to check and control a state of the air conditioner system by executing an application provided with or installed on the mobile terminal 200. The mobile terminal 200 may be, for example, a smart phone 200a embedded with an application for the air conditioner system, a laptop 200b, or a tablet or PC 200c, for example.

Figure 3A:
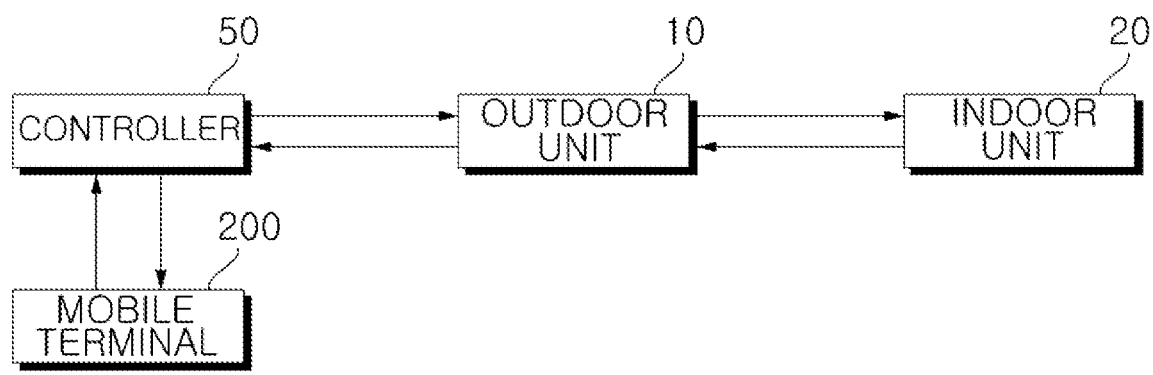
FIGS. 3A-3B are diagrams explaining communication in an air conditioner system according to an embodiment.
Figure 3B:
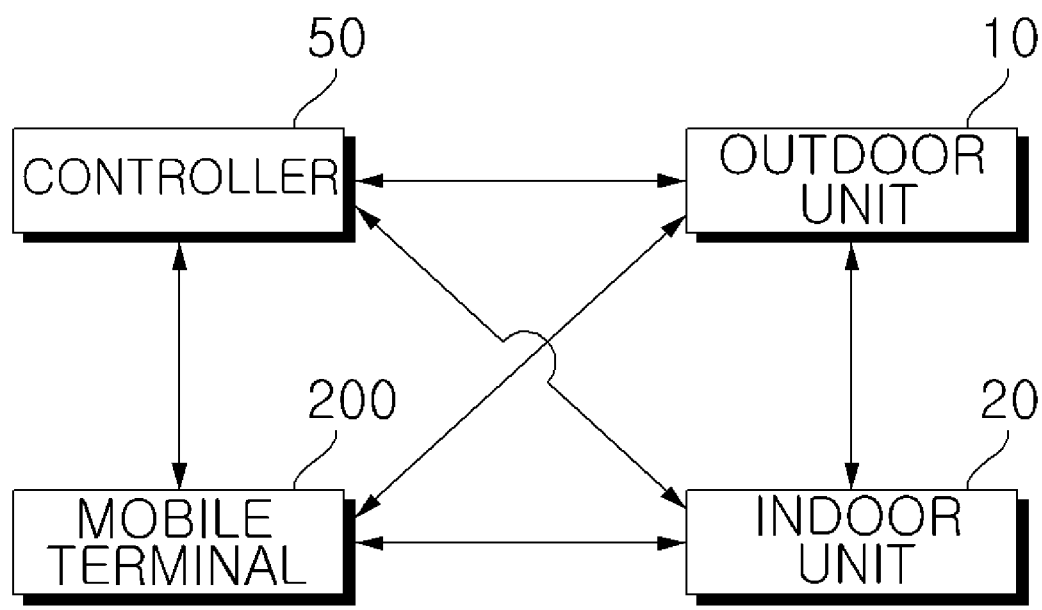

FIGS. 3A-3B are diagrams illustrating communication in an air conditioner system according to an embodiment. FIG. 3A shows communication between and among units using wired communication, and FIG. 3B shows communication between and among units using wireless communication.

Referring to FIG. 3A, a plurality of units or devices (including devices such as a controller 50, an outdoor unit or a plurality of outdoor units 10, an indoor unit or a plurality of indoor units 20, and/or a mobile terminal 200) in the air conditioner system may be connected via communication lines or wires. As there is a limitation in a connection of the communication lines, the plurality of units or devices may not be connected one by one, but may be connected in phases according to a shape or a connected shape of the communication lines.

A plurality of indoor units 20 may be connected to one outdoor unit 10 via a communication line, and the outdoor unit 10 may be connected to the controller 50. When there is a plurality of outdoor units 10, the plurality of indoor units 20 may be connected to the plurality of outdoor units 10 with reference to a connected state of a refrigerant pipe, such as first, second, and third refrigerant pipes P1, P2, or P3. The plurality of outdoor units 10 may be connected to the controller 50.

An indoor unit or a plurality of indoor units 20 may transmit data to an outdoor unit or a plurality of outdoor units 10, and an outdoor unit or the plurality of outdoor units 20 may transmit its own data and the data received from the indoor unit or the plurality of indoor units 20 to the controller 50. The controller 50 may check an operation state of the indoor unit or the plurality of indoor units 20 based on data received from the outdoor unit or the plurality of outdoor units 10.

In the case where the controller 50 transmits a control command to an indoor unit 20, the controller 50 may transmit the control command to an outdoor unit 10 connected to the indoor unit 20 and the outdoor unit 10 may transmit the received control command to the indoor unit 20. As such, when wired communication, units or devices in a plurality of units or devices may not be connected one by one (that is, each device does not connect to each and every other device in the plurality of units), so data may be transmitted in phases according to a connection state of the communication lines.

Accordingly, as data of an indoor unit 20 may not able to be transmitted directly, there may be a time delay in transmission of the data. In addition, as an outdoor unit 10 may need to process data on another unit or device, the load may be increased. Further, as one outdoor unit 10 may need to process data of a plurality of indoor units 20, it may take a long time to transmit data depending on the number of indoor units in the plurality of indoor units 20 connected to the outdoor unit 10.

In addition, even when a state of units or devices are monitored using the mobile terminal 200, data of an indoor unit 20 may not able to be transmitted directly and thus the data may be transmitted and received via the controller 50. The mobile terminal 200 may not be capable of freely communicating with each unit or device of the air conditioner system, and may need to receive, from a particular unit, only information about that particular unit and may need to communicate with the controller 50 of an upper layer in order to obtain whole information.

As shown in FIG. 3B, an outdoor unit or a plurality of outdoor units 10, an indoor unit or a plurality of indoor units 20, a controller 50, and a mobile terminal 200 may transmit and receives data with respect to each other via a wireless communication method. The controller 50 and/or the mobile terminal 200 may request data from each of the outdoor unit 10 or plurality of outdoor units 10 and the indoor unit 20, and may determine an operation state or abnormality of each unit based on data received from each of the outdoor unit 10 and the indoor unit 20. That is, each unit or device may connect to each and every other unit or device in the plurality of units.

Grouping an outdoor unit 10 and an indoor unit 20 in consideration of a flow of refrigerant has been described, but a communication channel including the controller 50, the outdoor unit 10, and the indoor unit 20 may be set separately from a communication channel between the outdoor unit 10 and the indoor unit 20. The controller 50 and/or the mobile terminal 200 may change an operation setting of the indoor unit 20 based on data received from the indoor unit 20 according to a condition (such as temperature or humidity) of an indoor space where the indoor unit 20 is installed, and may transmit data based on the change of the operation setting directly to the indoor unit 20. When the operation setting is changed, the indoor unit 20 may transmit data corresponding to the change of the operation setting to the outdoor unit 10, and so operation of the outdoor unit 10 is changed as well.

When the indoor unit 20 is scheduled to operate at a preset or predetermined time, the controller 50 may transmit an operation command to the indoor unit 20 and the outdoor unit 10 connected thereto, and the indoor unit 20 may transmit a response to the operation command to the controller 50 and transmit data on an operation state thereof at a predetermined interval or a predetermined time interval. In response to data received through an input unit or data received from the controller 50, the indoor unit 20 may set an operation and may transmits data to the outdoor unit 10. The outdoor unit 10 may control a compressor by calculating a load according to the data received from the indoor unit 20 and according to an operation state of a plurality of indoor units 20. The outdoor unit 10 and the indoor unit 20 may transmit data to the controller 50 at the predetermined time interval, and may also transmit error or abnormality-related data to the controller 50 in response to an occurrence of an error or an abnormality, regardless of a cycle.

Figure 4:
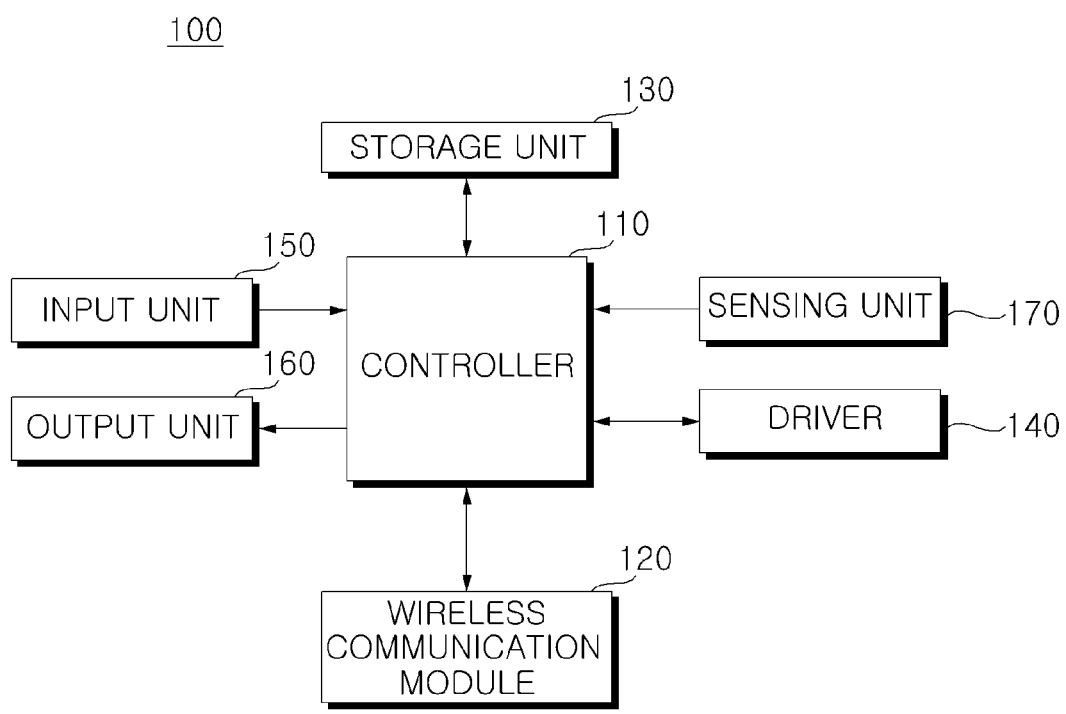
FIG. 4 is a block diagram schematically illustrating control of a configuration of units or devices in an air conditioner system according to an embodiment.

FIG. 4 is a block diagram schematically illustrating control of a configuration of units or devices in an air conditioner system according to an embodiment. The air conditioner system may include an electronic device 100. The electronic device 100 may be one of an indoor unit 20, an outdoor unit 10, a controller 50, and a wireless sensor in an air conditioner system. Referring to FIG. 4, the electronic device 100 in the air conditioner system may include a driver or drive 140, a sensing unit, sensing assembly, or sensor 170, an output unit, output, or display 160, an input unit or input 150, a storage unit, storage, or memory 130, and a controller 110 that controls an overall operation.

In addition, the electronic device 100 may be provided with a wireless communication module 120 or may be connected to the wireless communication module 120. The wireless communication module 120 may be embedded in the electronic device 100 or installed outside the electronic device 100.

An additional component may be added depending on characteristics of a product. For example, the outdoor unit 10 may include a compressor, an outdoor unit fan or outdoor fan, and a plurality of valves. Accordingly, drivers of the outdoor unit may be classified into a compressor driver, an outdoor unit fan driver or outdoor fan driver, and a valve controller or an outdoor valve controller.

The indoor unit 20 may be provided with a louver or a vane as a wind direction adjusting means, and may be provided with an indoor unit fan driver or indoor fan, a valve controller or an indoor valve controller, a wind direction controller, and a plurality of valves. In addition, a type, number, and installation positions of sensors included in the sensing assembly 170 may vary depending on a type of a unit.

The storage 130 may store control data that controls an operation of the electronic device 100, communication data that sets an address necessary to communicate with another electronic device 100 or necessary to set a group, data transmitted and received with respect to an outside of the air conditioner system, and operation data generated or sensed during an operation. The storage 130 may store an execution program of each function of the electronic device 100, data used in operation control, and transmitted and received data.

The storage 130 may be implemented in a hardware manner as a variety of storage devices such as ROM, RAM, EPROM, flash drive, and hard drive, for example. The input 150 may include at least one input means or one input interface, such as a button, a switch, and/or a touch input or touch input means. When a user command or specific or predetermined data is input or entered via the input means or input interface, the input 150 may transmit the input data to the controller 110. The outdoor unit 10 may be provided with a test run key and an address setting key, and the indoor unit may be provided with a power key, a menu input key, an operation setting key, a temperature adjusting key, a wind power key, or a lock key, for example.

The output unit 160 may include at least one of a lamp or light which is controlled to be turned on or blink, an audio output unit or audio output provided with a speaker to output or play specific or predetermined sound, or a display so as to output an operation state of the electronic device 100. The light indicates whether the electronic device 100 is in operation depending on whether the light is turned on, the color of the light emitted, or whether the light is blinking, and the speaker may output an operation state via a specific or predetermined alarm sound or effect sound. The display may output a menu screen to control the electronic device 100, and may also output a guidance message or an alarm related to an operation setting or an operation state of the electronic device 100, wherein the guidance message or the alarm is composed of a combination of at least one of a text, a number, or an image.

The sensing assembly 170 may include a plurality of sensors. The sensing assembly 170 may include a pressure sensor, a temperature sensor, a gas sensor, a humidity sensor, and/or a flow sensor. For example, a plurality of temperature sensors may be provided to sense an indoor temperature, an outdoor temperature, a temperature of an indoor heat-exchanger, a temperature of an outdoor heat-exchanger, and/or a pipe temperature, and the plurality of temperature sensors may input sensed values to the controller 110. The pressure sensor may be installed at an inlet port or inlet and an outlet port or outlet of a refrigerant pipe, may measure pressure of flowing refrigerant and pressure of discharged refrigerant, and may input measurements or sensed data to the controller 110. The pressure sensor may be installed not just in the refrigerant pipe, but also in a water pipe.

The driver 140 may supply a power or an operation power to a control target in accordance with a control command of the controller 110, and may control a driving of the control target. As described above, when an outdoor unit, the driver 140 may be provided as a compressor driver, an outdoor unit fan or outdoor fan driver, and/or a value controller that controls a compressor, an outdoor fan, and a valve, respectively. The driver 140 may apply the operation power to motors provided in the compressor, the outdoor fan, and the valve, for example, so that preset operations may be performed upon operation of the motors.

The wireless communication module 120 may support at least one or more wireless communication methods, and may communicate with another unit in accordance with a control command of the controller 110. The wireless communication module 120 may transmit and receive data in a wireless communication method set between the controller, the outdoor unit, and the indoor unit, and may transmit received data to the controller.

The wireless communication module 120 may set an address for communication between units, may transform data to be transmitted and received, and may process a signal. Upon operation of the electronic device 100, the wireless communication module 120 may search for another unit or another electronic device in the same frequency band through wireless communication, and may verify connection to that unit. The wireless communication module 120 may communicate by allocating a temporary address for an initial operation or by setting a received temporary address. When setting an address in response to a control command of the controller 110, the wireless communication module 120 may request a product number from the controller 110 and set an address based on the product number. The product number may be a unique number, a serial number, a Media Access Control (MAC) address, or the like of that other unit.

The controller 110 may control data to be input and output through the input 150 and the output 160, may manage data stored in the storage 130, and may control a transmission and a reception of data through the wireless communication module 120. The controller 110 may sense a connection state and a communication state of the wireless communication module 120 through a connection unit, and may determine an error.

The controller 110 may generate a control command to operate in accordance with a request from another unit, another electronic device, or a set operation setting, and may transmit the control command to the driver 140. Accordingly, the driver 140 may control a component connected thereto; for example, a compressor, an output unit fan or output fan, a valve, an indoor fan, and/or a wind direction adjusting means, vane, or louver to operate.

While the electronic device 100 is in operation, the controller 110 may determine an operation state of the electronic device 100 based on data received from a plurality of sensors of the sensing unit 170, and may output an error. The wireless communication module 120 may be provided inside the electronic device 100 or may be connected to the electronic device 100 via a connection unit. The wireless communication module 120 may receive data of the electronic device 100 via the connection unit, and may transmit received data to the electronic device 100.

The wireless communication module 120 may wirelessly communicate using a sub-GHz frequency band so that communication is enabled despite the presence of a wall, a floor, or an obstacle, for example, in a building. The sub-GHz frequency band has excellent transmission and rotation characteristics, and thus may be less attenuated in response to a wall or an inter-floor object. Thus, the wireless communication module 120 may be efficiently communicate within an air conditioner system provided with a plurality of units in a building partitioned by walls.

The wireless communication module 120 may communicate using one of 400 MHz or 900 MHz, which are unlicensed bands available for a lower power wireless station in Sub-GHZ bands. The wireless communication module 120 may selectively use 400 MHz and/or 900 MHz in response to a standard which is different depending on a region or country. In addition, the wireless communication module 120 may further include a Zigbee module, a Bluetooth module, a Near Fields Communication (NFC) module, and any other communication module which may be or may include a short-range communication technology.

The wireless communication module 120 may include a plurality of communication modules, so the same communication module or different communication modules may be used in communication between an outdoor unit 10 and another indoor unit 20, communication with a remote controller, and/or communication with the controller 110. The wireless communication module 120 may communicate via a different communication method according to a target to communicate, by selectively changing the communication method in response to the target to communicate.

When different channels are used in communication with an indoor unit 20 and communication with a controller 110, the wireless communication module 120 may transmit and receive data by setting a different channel according to a target to communicate. According to the Korean radio wave act, over a frequency band of 400 MHz or 900 MHx, there are 21 channels between 424.7 MHz and 424.95 MHz and 11 channels between 447.8625 MHz and 447.9875 MHz for radio equipment of a specific or predetermined low-power wireless station used for data transmission, and 32 channels between 917 MHz and 923.5 MHz for radio equipment of RFID/USN. Thus, communication may be performed using the above channels.

Unlicensed frequency bands used in countries are as below: 902-928 MHz (FCC Part 15.247) in North and South America; 433 MHz, 915 MHz, and 863-868 MHz (ETSIEN300220) in Europe; 920-928 MHz (ARIB STD-T108) in Japan; 920 MHz in China; 424-447 MHz and 917-923.5 MHz (KC) in South Korea; 865-867 MHz (G.S.R 564(E)) in India; 433 MHZ and 915 MHZ in Australia; and 433 MHz in South Africa. Across the world, 2.4 GHz and 5.72 GHz are commonly available. In addition, if 902-928 MHz is used in North and South America, 863-868 MHz in Europe, 920-928 MHz in Japan, 917-923.5 MHz in South Korea, 865-867 MHz in India, and 2.74 GHz/5.72 GHz commonly across the word, communication may be possible at 50 kbps or faster.

As an obstacle such as a wall between floors and furniture may exist in a building, a frequency band which allows a signal to pass through such an obstacle and reach a predetermined distance or more may be used. The Industrial, Scientific and Medical (ISM) band (100 MHz, 20 MHz, 400 MHz, 900 MHz) in Sub-GHz bands has an excellent penetration ability in a building and thus enables inter-floor communication. A length of an antenna may depend on a transmitting frequency band, and, since 100 MHz and 200 MHz requires a long antenna length, there may be a restriction in antenna installation. Therefore, the wireless communication module 120 may be configured to communicate using a frequency band of 400 MHz or 900 MHz out of the aforementioned frequency bands.

The wireless communication module 120 may receive a search signal from a mobile terminal 200, and transmit a response signal in response to the received search signal. When a signal corresponding to an electronic device search command, or a search command from an electronic device 100, is received from the mobile terminal 200, the controller 110 may control a set feedback operation to be performed.

The controller 110 may control the output unit 160 to perform the set feedback operation. For example, when the output unit 160 is provided with a lamp or light, the set feedback operation may be turning on the light. When the output unit 160 is provided with a display, the set feedback operation may be displaying a specific image on the display. When the output unit 160 is provided with an audio output unit or an audio output, the set feedback operation may be outputting a predetermined or specific sound via the audio output.

Alternatively, the controller 110 may transmit a signal to a remote controller connected to a corresponding electronic device 100 so as to control the remote controller to output a visual and/or audible effect. The controller 110 may control the driver 140 to perform a preset feedback operation.

When the wireless communication module 120 receives a signal corresponding to an electronic device search command from a mobile terminal 200, the controller 110 may control the driver 140 to swing a louver or vane a predetermined number of times when the electronic device 100 is located indoors. Accordingly, finding or identifying a particular unit or device from among a plurality of electronic devices 100 in one building may be quick and easy.

Figure 5:
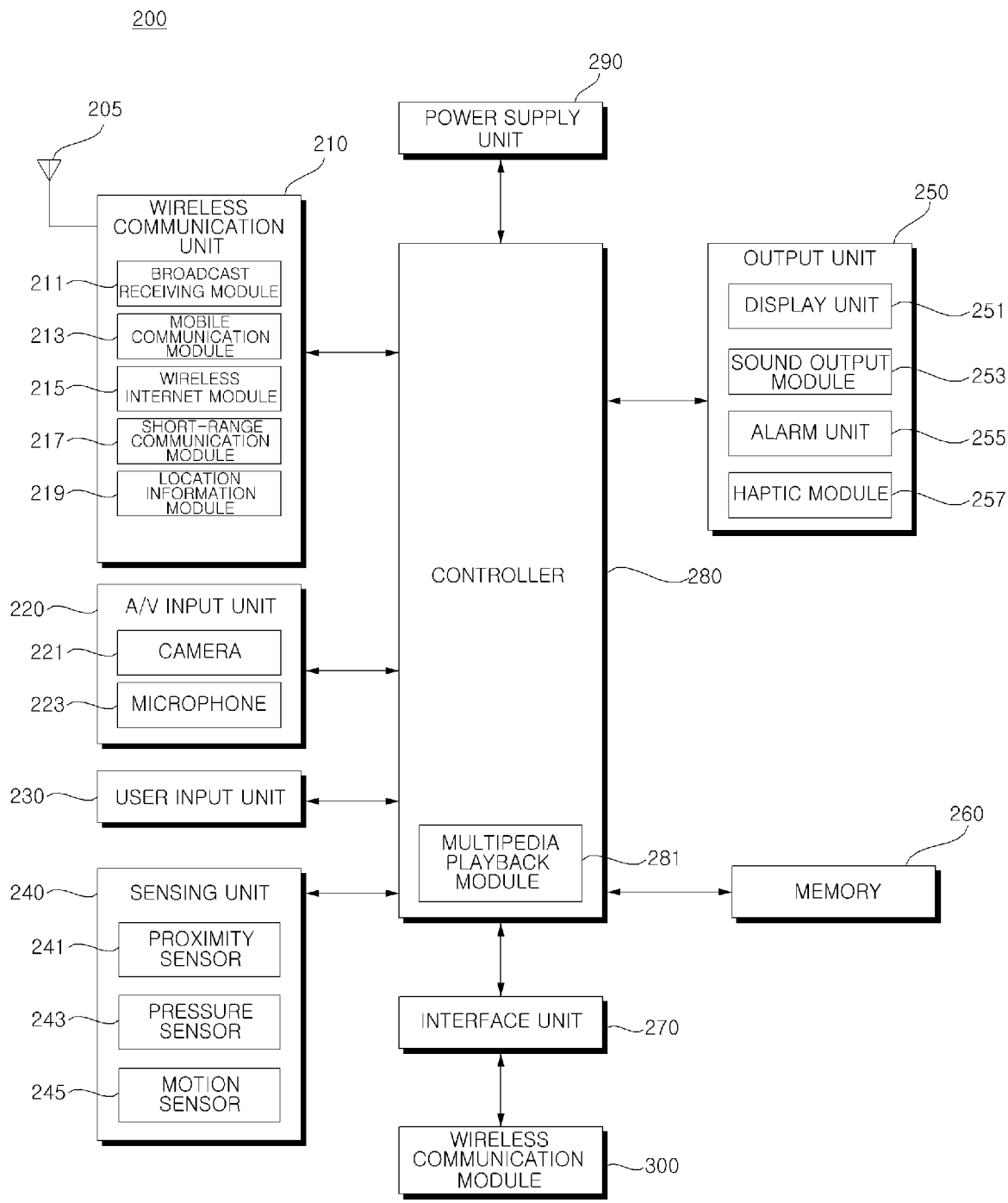
FIG. 5 is an inner block diagram schematically illustrating a mobile terminal according to an embodiment.

FIG. 5 is an inner block diagram schematically illustrating a mobile terminal according to an embodiment. Referring to FIG. 5, a mobile terminal 200 may include a wireless communication unit or a wireless communication assembly 210, an Audio/video (A/V) input unit or an A/V input 220, a user input unit or user input 230, a sensing unit or sensor 240, an output unit or output 250, a memory or storage 260, an interface unit or interface 270, a controller 280, and a power supply unit or power supply 290.

The mobile terminal 200 may include a display unit or display 251, a wireless communication module 300 that wirelessly communicates with a plurality of electronic devices 100; and a controller 280 that controls the wireless communication module 300 to transmit a search signal regarding the plurality of electronic devices 100 and to receive response signals from the plurality of electronic devices 100; and controls the display 251 to display a search result screen regarding the electronic devices 100 from which the response signals are received.

The wireless communication module 300 may be configured as one block of the wireless communication assembly 210. The wireless communication module 300, which supports wireless communication in a sub-GHz band, may be used to wireless communicate with each electronic device 100 included in the air conditioner system using a sub-GHz band. Not all of the common mobile terminals 200 may be embedded with the wireless communication module 300 supporting sub-GHz band wireless communication, so a dedicated wireless communication module 300 may be used to create a connection.

The wireless communication module 300 may be connected via the interface 270 or via the wireless communication assembly 210. A search signal regarding a plurality of electronic devices 100 may be a search signal regarding wireless communication modules 120 provided in the plurality of electronic devices 100. The response signals may include identification information of the wireless communication modules 120 provided in the plurality of electronic devices 100, or identification information of the plurality of electronic devices 100.

The controller 280 may transmit a signal to request a search for the plurality of electronic devices 100 to the wireless communication module 300, and, when a predetermined period of time has elapsed, the controller 280 may transmit a signal to request a search result.

Based on a signal strength of the response signals, the controller 280 may perform control to display items corresponding to the electronic devices 100 from which the response signals are received so that a user may easily check information on a found device, and control the corresponding device.

If a search input is received regarding one of the items displayed on the search result screen, the controller 280 may perform control to transmit a predetermined signal to an electronic device 100 corresponding to the item regarded in the received search input. The predetermined signal may be a signal to request the recipient electronic devices 100 to perform a feedback operation set for each of the recipient electronic devices 100 so that a user may quickly and easily find a particular unit or device from among the plurality of units or devices 100 in a building.

The items corresponding to the electronic devices 100 from which the response signals are received may be displayed sequentially in descending order of signal strength of the response signals. In addition, the search result screen may include an object corresponding to a mobile terminal 200 and objects corresponding to the electronic devices 100 from which the response signals are received. The greater the strength of a response signal received from an electronic device 100, the closer the object corresponding to the electronic device may be displayed relative to the object corresponding to the mobile terminal 200. The electronic devices 100 from which the response signals are received may be displayed on the search result screen in a manner that distinguishably displays the electronic devices 100 based on type.

The wireless communication assembly 210 may include a broadcast receiving module or broadcast receiver 211, a mobile communication module 213, a wireless internet module 215, a short-range communication module 217, and a location information module or location module such as a Global Position System (GPS) module 219.

The broadcast receiver 211 may receive at least one of a broadcast signal or broadcast-related information from an external broadcast management server via a broadcast channel. The broadcast channel may include a satellite channel or a terrestrial channel, for example. The broadcast signal and/or the broadcast-related information received through the broadcast receiver 211 may be stored in the memory 260.

The mobile communication module 213 may transmit and receive a radio signal with respect to at least one of a base station, an external terminal, or a server on a mobile communication network. The radio signal may include a voice call signal, a video call signal, and/or various types of data according to transmission and reception of text and/or multimedia message.

The wireless internet module 215 may refer to a module or device that enables or allows wireless Internet access. The wireless internet module 215 may be embedded in or may be external to the mobile terminal 200. For example, the wireless internet module 215 may perform a Wi-Fi-based wireless communication or a Wi-Fi Direct-based wireless communication.

The short-range communication module 217 may refer to a module that enables or allows a local area communication, and that may support short-range communication using at least one of the following: Bluetooth™, Radio Frequency Identification (RFID), Infrared Data Association (IrDA), Ultra Wideband (UWB), and ZigBee. The short-range communication module 217 may support wireless communication between the mobile terminal 200 and a wireless communication system, wireless communication between the mobile terminal 200 and another mobile terminal 200, wireless communication between the mobile terminal and a different mobile terminal, or wireless communication between the mobile terminal 200 and a network in which an external server is located via short-range wireless area networks.

The GPS or location module 219 may receive position information from a plurality of GPS satellites. The wireless communication assembly 210 may exchange data with a server using one or more communication modules. The wireless communication assembly 210 may include an antenna 205 allowing wireless communication, and may include an antenna that receives a broadcast signal in addition to an antenna that makes a call.

The A/V input 220 may be related to or may receive an audio signal or a video signal, and may include a camera 221 and a microphone 223. The user input 230 may generate key input data that is input by a user to control an operation of the mobile terminal 200. The user input 230 may be in the form of a key pad, a dome switch, or a touch pad (static pressure/electrostatic), for example. In particular, if a touch pad forms an inter-layered structure with a display unit or display 251, the structure may refer to a touch screen.

The sensing assembly 240 may generate a sensing signal that controls the operation of the mobile terminal 200. The sensing assembly 240 may sense a current state of the mobile terminal 200; for example, the sensing assembly 240 may sense an opened/closed state of the mobile terminal 200, a position of the mobile terminal 200, and/or a user's contact.

The sensing assembly 240 may include a proximity sensor 241, a pressure sensor 243, and a motion sensor 245, for example. The motion sensor 245 may sense movement or a position of the mobile terminal 200 using an accelerometer, a gyro sensor, or a gravity sensor, for example. In particular, the gyro sensor may be a sensor that measures an angular velocity. The gyro sensor may be able to sense a direction or an angle of rotation against a reference direction.

The output 250 may include the display 251, a sound output module or a speaker 253, an alarm unit or alarm 255, or a haptic module or kinesthetic communication module 257, for example. The display 251 may present or display information processed in the mobile terminal 200. When the display 251 forms an inter-layered structure with a touch pad to implement a touch screen, the display 251 may be used as both an output device and an input device to which information may be input by a user's touch. The speaker or sound output module 253 may output audio data received from the wireless communication assembly 210 or stored in the memory 260. The sound output module 253 may include a speaker or a buzzer, for example.

The alarm 255 may output a signal that notifies occurrence of an event in the mobile terminal 200. For example, the alarm 255 may output a signal in the form of vibration, or the alarm 255 may output a signal that controls the haptic module 257 to generate a tactile effect. The haptic module 257 may generate various tactile effects that a user can feel, such as vibrations. The memory 260 may store a program that processes and controls the controller 280, or may temporarily store input and output data, for example, a phone book, messages, still images, or videos.

The interface 270 may serve or act as a channel with all external devices connected to the mobile terminal 200. The interface 270 may receive data or power from an external device and transfers the received data or power to each element, unit, or device of the mobile terminal 200 or allow internal data of the mobile terminal 200 to be transmitted to an external device.

The controller 280 may control an overall operation of the mobile terminal 200 by controlling operations of each of the aforementioned elements, units, or devices of the mobile terminal 200. For example, the controller 280 may control or process a voice call, data communication, and a video call. In addition, the controller 280 may be provided with a multimedia playback module or a multimedia player 281 that plays multimedia. The multimedia player 281 may be implemented in a hardware form inside the controller 280, or may be implemented in a software form separately from the controller 280. The power supply 290 may receive external and internal power under a control of the controller 280, and may supply power necessary to operate each element, unit, or device of the mobile terminal 200.

Depending on specifications of the mobile terminal 200 in actual implementation, each constituent element, unit, or device of the mobile terminal in the block diagram of FIG. 5 may be combined or omitted, or a new element may be added. Two or more components may be combined into one element, unit, or device, or one component or one element may be divided into two or more components or two or more elements, as needed. In addition, the function of each block is described for the purpose of describing an embodiment and thus specific operations or devices should not be construed as limiting the scope and spirit of embodiments disclosed herein.

Figure 6:
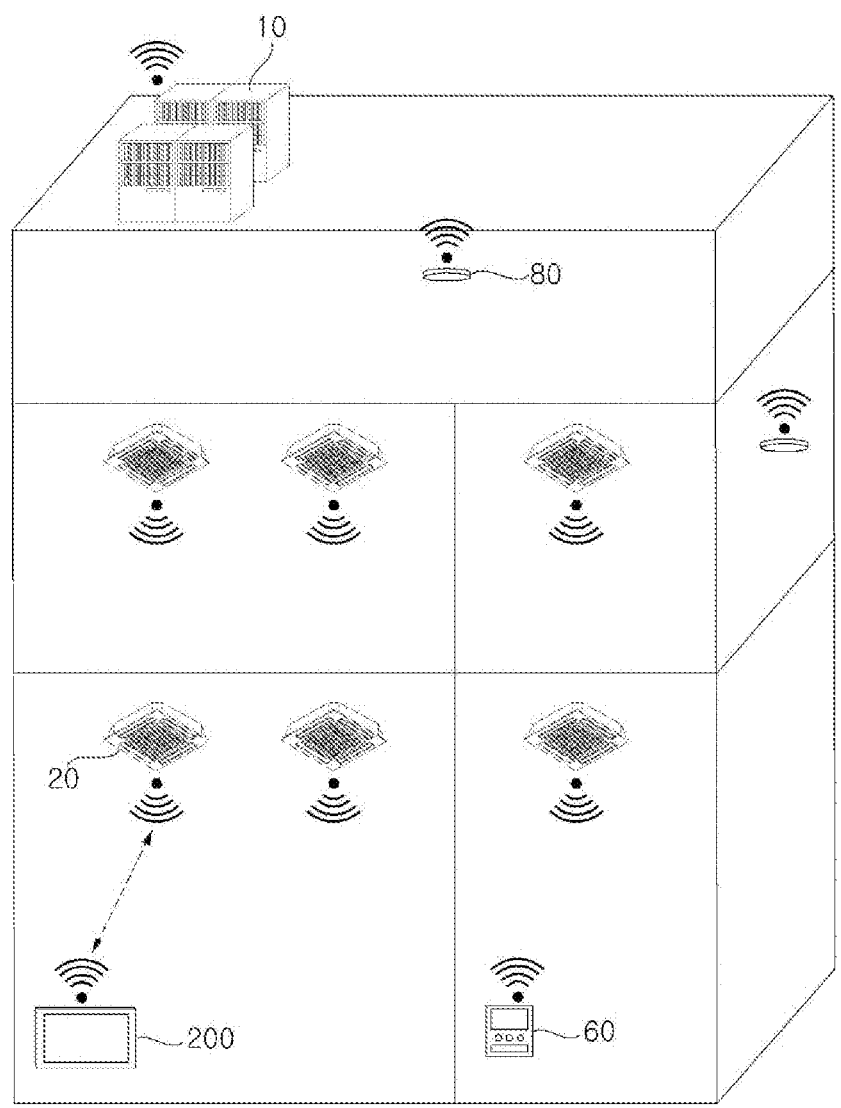
FIG. 6 is a diagram explaining an air conditioner system according to an embodiment.

FIG. 6 is a diagram illustrating an air conditioner system according to an embodiment. Referring to FIG. 6, the air conditioner system may include an indoor unit 20, an outdoor unit 10, a remote controller 60, a wireless sensor 80, and a mobile terminal 200. The air conditioner system may further include a controller, a ventilator, a defroster, a humidifier, or a heater, for example.

The remote controller 60 may be connected to the indoor unit 20 or the outdoor unit 10 in a wired manner or in a wireless manner. As described above with reference to FIGS. 1 to 5, the mobile terminal 200 and the controller 50 (see FIG. 1) may be wirelessly connected to units such as the indoor unit 20 and the outdoor unit 10, and may control each of the units. The indoor unit 20 may include a plurality of indoor units, and the outdoor unit 10 may include a plurality of outdoor units. The mobile terminal 200 and the controller 50 may control each of the indoor and outdoor units 10 or 20.

In response to a request for data information from the mobile terminal 200 or the controller 50, the indoor unit 20 and the outdoor unit 10 may transmit the requested data information. Depending on the request from the mobile terminal 200 or the controller 50, the indoor unit 20 and the outdoor unit 10 may transmit data information with different content.

The indoor unit 20 and the outdoor unit 10 may receive a control signal from the mobile terminal 200 and the controller 50. When receiving the control signal from the mobile terminal 200 or the controller 50, the indoor unit 20 and the outdoor unit 10 may report reception of the control signal to the mobile terminal 200 or the controller 50, but aspects of embodiments disclosed herein are not limited thereto and the above process may vary depending on a communication method adapted by the air conditioner system.

When receiving the control signal, the indoor unit 20 and the outdoor unit 10 may perform an operation corresponding to the control signal. The indoor unit 20 and the outdoor unit 10 may receive, from the mobile terminal 200 or the controller 50, a storage cycle or a storage time to store a data signal or data information including an operation state. The indoor unit 20 and the outdoor unit 10 may store data information periodically or in response to occurrence of an error.

When an error occurs, the indoor unit 20 and the outdoor unit 10 may extend the storage time of the recently stored data information. Each of the indoor unit 20 and the outdoor unit 10 may include a storage medium or memory that stores the data information. For example, the indoor unit 20 and the outdoor unit 10 may periodically receive data information and may store, in response to occurrence of an error, the recently stored data information in a way that distinguishes the recently stored data information from other information or data information, but aspects of the embodiments disclosed herein are not limited thereto.

The data information may include an operation state of the indoor unit 20 or the outdoor unit 10. For example, the data information may include air temperature, compression temperature, evaporation temperature, discharge temperature, or heat-exchanger temperature, for example, but aspects of embodiments disclosed herein are not limited thereto and the data information may include a broad range of information related to operation of the indoor unit 20 or the outdoor unit 10.

The indoor unit 20 or the outdoor unit 10 may transmit data information including the operation state to the mobile terminal 200 or the controller 50. When an on/off state or the operation state of the indoor unit 20 or the outdoor unit 10 is changed or when an error occurs, the indoor unit 20 or the outdoor unit 10 may transmit corresponding data information to the mobile terminal 200 or the controller 50. The indoor unit 20 or the outdoor unit 10 may communicate with the mobile terminal 200 or the controller 50 in a predetermined period or a predetermined time period in response to occurrence of an event. The mobile terminal 200 or the controller 50 may receive in real time detailed cycle data, which allows error analysis of each unit (or each of the indoor or outdoor units 20, 10), and may display the received data on a screen.

When the mobile terminal 200 or the controller 50 displays data information in a test form such as numbers, data information of the indoor unit 20, data information of the outdoor unit 10, and valve information of a pipe connecting the indoor unit 20 and the outdoor unit 10 may be displayed. In some implementations, when displaying the valve information, the mobile terminal 200 or the controller 50 may display opening or closing, an opened/closed status, or an on/off status of a valve in the form of color or a picture. For example, the mobile terminal 200 or the controller 50 may display or indicate an opened valve in blue and a closed valve in gray, or may display a picture of an opened valve and/or a picture of a closed valve, but aspects of embodiments disclosed herein are not limited to the aforementioned color or types of pictures.

When displaying data information in the form of a time series image, the mobile terminal 200 or the controller 50 may select an outdoor unit 10 or an indoor unit 20 to display. When selecting one outdoor unit 10 from among a plurality of outdoor units 10, the mobile terminal 200 or the controller 50 may select one indoor unit 20 to check from among a plurality of indoor units 20 connected to the selected outdoor unit 10.

When the outdoor unit 10 and the indoor unit 20 are selected, the mobile terminal 200 or the controller 50 may receive data information, which may include an operation state of the selected indoor unit 20 and a connection state between the selected outdoor unit 10 and the selected indoor unit 20. The connection state may include a connection state of a pipe, a flow inside the pipe, or an on/off state or an opened/closed state of the valve, for example, but aspects of embodiments disclosed herein are not limited thereto.

The mobile terminal 200 or the controller 50 may display an operation state of the selected outdoor unit 10 and the selected indoor unit 20 in a time-series manner in the form of a change of a picture or change of color. The mobile terminal 200 or the controller 50 may display a state of a pipe connecting the selected outdoor unit 10 and the selected indoor unit 20, and an on/off state of a valve.

The mobile terminal 200 or the controller 50 may check in real time an operation state of the indoor unit 20 or the outdoor unit 10. When checking the operation state of the indoor unit 20 or the outdoor unit 10 in real time, the mobile terminal 200 or the controller 50 may receive data information in real time and display the received data information. The wireless sensor 80 may sense an air condition or a condition of the air, and may transmit air condition data corresponding to the sensed air condition.

The air condition may be a condition of the air based on at least one of temperature, humidity, pressure, an amount of dust, an amount of carbon dioxide, or an amount of oxygen. Accordingly, the wireless sensor 80 may measure at least one of temperature, humidity, pressure, an amount of dust, an amount of carbon dioxide, or an amount of oxygen. The air condition data may include data on at least one of temperature, humidity, pressure, an amount of dust, an amount of carbon dioxide, or an amount of oxygen.

The wireless sensor 80 may transmit the air condition data in a broadcast manner. The broadcast manner may be a method of transmitting data without specifying a recipient. By transmitting air condition data to a predetermined communication network without specifying a recipient, the wireless sensor 80 may save energy, operations, and components necessary to set a recipient of the data.

The air condition data broadcast by the wireless sensor 80 may be transferred to the outdoor unit 10 or the indoor unit 20. The air condition data broadcast by the wireless sensor 80 may be transferred to the controller 50 or the mobile terminal 200. The indoor unit 20 or the outdoor unit 10 may perform an appropriate air conditioning operation based on the received air condition data. The indoor unit 20 or the outdoor unit 10 may operate in accordance with a control signal received from the controller 50 or the mobile terminal 200.

As shown in FIG. 6, when units such as indoor units 20 and outdoor units 10 are wirelessly connected in the air conditioner system, installation costs and time may be reduced, compared to when the units are connected in a wired manner. It is possible to check information of any one unit of the indoor and outdoor units 20, 10 and control the corresponding unit via direct communication with the corresponding unit without passing through a particular unit, such as the controller 50. Communication time may therefore be reduced, making use more convenient.

When a number of units or electronic devices 100 communicate with each other in a predetermined space, such as a building and an apartment, interference may occur between devices positioned in neighboring or local areas. For example, a plurality of indoor units 20 that have a same or similar shape may be positioned in one building. In addition, a number of indoor units in the plurality of indoor units 20 may be positioned on one floor or in one office. Furthermore, other units or devices, such as a remote controller 60 and/or a sensor 80, may be positioned in a predetermined space.

Each of the indoor units in the plurality of indoor units 20, an outdoor unit 10, a controller 50, the remote controller 60, and the sensor 80 may be part of a wireless node. As the number of wirelessly connected devices or units is increased, interference between devices positioned in neighboring areas may occur or also increase.

For example, if the plurality of indoor units 20, the outdoor unit 10, the controller 50, the remote controller 6, and the sensor 80 operate with or wirelessly communicate according to a default value set when they were first released, signal interference between adjacent units or devices may be reduced according to an installation environment. Thus, there are demands for a method for optimizing signal strength and a wireless communication range in order to prevent mutual interference between wirelessly connected units or devices. Embodiments disclosed herein provide a method for reducing unnecessary communication signal interference by optimizing the signal strength and/or wireless range between wirelessly connected units or devices after establishment of a communication connection between the devices, and a method for increasing use of limited wireless communication channels.

Figure 7:
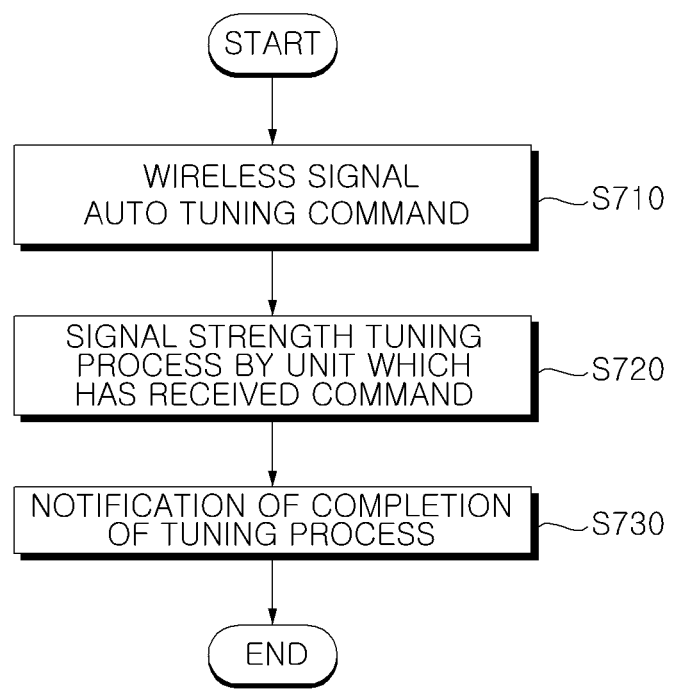
FIG. 7 is a flowchart illustrating a method for controlling an air conditioner system according to an embodiment.

FIG. 7 is a flowchart illustrating method for controlling an air conditioner system according to an embodiment. The air conditioner system according to an embodiment may include at least one outdoor unit 10 and a plurality of indoor units 20. An air conditioner system installed in a large building may include a plurality of outdoor units 10 and a plurality of indoor units 20. In this case, a number of indoor units of the plurality of indoor units 20 may be grouped with one outdoor unit 10, and may be connected thereto via a refrigerant pipe.

In addition, as described above with reference to FIGS. 1 to 6, units or devices belonging to a particular group may wirelessly communicate with each other using a sub-GHz frequency band. The air conditioner system may further include units or devices such as a controller 50, a wired or wireless remote controller 60, or a sensor 80, for example, in addition to the indoor and outdoor units 10, 20.

Referring to FIG. 7, a first unit out of a plurality of units belonging to a particular group may transmit a wireless signal auto tuning command or a tuning command to a second unit in S710. The tuning command may be a user command received through one of the plurality of units belonging to the particular group, or may be automatically transmitted after an initial communication network is constructed.

For example, the first unit may be an outdoor unit 10. Alternatively, the first unit may be the controller 50. For example, the first unit may be a central controller.

After a command is received from a user or after an initial communication network is constructed, the first unit, such as the outdoor unit 10 or the central controller, may act as a master device and transmit a tuning command to a second unit belonging to the same particular group. The second unit may be an indoor unit 20, a remote control device such as a wired or wireless remote controller 60, or a wireless sensor 80.

The indoor unit 20, the remote controller 60, and the wireless sensor 80, for example, may be slave devices, or devices controlled by the master device. The master devices and the slave devices are part of the same group or network. The first device may be the master device, and the second device may be a slave device.

The slave devices may receive a tuning command from the master device. Next, one of the slave devices that received the tuning command may tune a strength of the signal in S720. Tuning the strength of the signal may include measuring reception sensitivity and transmission and reception success rates of the signal by changing the strength of the wireless signal transmitted by a unit, and determining the signal strength to be used for subsequent wireless communication based on the measurements. For example, the second unit may measure reception sensitivity and a transmission and reception success rate of a signal by wirelessly communicating with other units or devices in the same group while reducing signal strength from a default signal strength by one level at a time.

If the reception sensitivity and the transmission and reception success rate, which are measured by the second unit, satisfy a predetermined standard, the second unit may determine that the signal strength corresponding to a level that is right before, below, or adjacent to a level that satisfies the predetermined standard is the signal strength to be used, or the determined signal strength. The predetermined standard may be a standard where one of the reception sensitivity or the transmission and reception success rates of the signal is equal to or smaller than a reference value.

The second unit may transmit a wireless signal having a default signal strength to the other units or devices in the same group, receive response signals therefrom, and measure reception sensitivity and transmission and reception success rates of the wireless signal.

The default signal strength may be set to a different level depending on unit type. For example, a relatively strong default signal strength may be set for an indoor unit 20 required to communicate with an outdoor unit 10 and another indoor unit 10, so the signal strength of a wireless signal may be reduced from the strong default signal strength by one level at a time. A relatively weak default signal strength may be set for a remote controller 60 communicating with one indoor unit 20 or a small number of indoor units 20, so signal strength of a signal may be reduced from the weak default signal strength by one level at a time. Even for a sensor, default signal strength may be determined by a wireless communication range required in an embodiment.

If reception sensitivity and transmission and reception success rates of a wireless signal having a default signal strength are greater than a preset reference value or standard, signal strength of the transmitted wireless signal may be reduced by a predetermined degree, and the wireless signal having the reduced signal strength may be transmitted to the units or devices of the same group. Next, response signals may be received from the units or devices to thereby measure reception sensitivity and transmission and reception success rates of the transmitted wireless signal having the reduced signal strength.

If the default signal strength is set to a first-level signal strength or a first signal strength, and the reduced signal strength is a second-level or second signal strength, a value by which the first signal strength is reduced to the second signal strength may be set in advance. If the reception sensitivity and the transmission and reception success rates of the wireless signal having the second signal strength is greater than the preset reference value or standard, the signal strength may be reduced by a predetermined degree and a wireless signal having a third-level signal strength or third signal strength smaller than the second signal strength may be transmitted to units or devices of the same group. Next, response signals may be received from the units to thereby measure reception sensitivity and transmission and reception success rates of the wireless signal having the third signal strength.

If the reception sensitivity and the transmission and reception success rate of the wireless signal having the third signal strength are equal to or smaller than the preset reference value or standard, the second unit may determine that the second signal strength before the third signal strength is the signal strength to be used in wireless communication. That is, if the quality of communication is reduced to a predetermined level or lower, signal strength of a level right before a level at which the quality of communication has been verified may be used, and thus a wireless communication range of a corresponding unit may be adjusted to a minimum range required to communicate with other units. This adjustment process may minimize interference in communication. An amount of power to be used in wireless communication may also be minimized. This adjustment process may be a tune-down method.

When the tuning process is completed as the signal strength is determined, the second unit may notify the first unit of the completion of the tuning process in S730. The second unit may transmit information related to the determined signal strength to the first unit in S730. For example, the second unit may transmit, to the first unit, information related to the second signal strength which was determined to be the signal strength to be used.

In addition, information related to the determined signal strength may include data on the determined signal strength, data on the reception sensitivity, and data on the transmission and reception success rates.

Embodiments disclosed herein may minimize signal interference between many units or devices installed and wirelessly connected in the same or adjacent buildings with limited frequency resources. Embodiments disclosed herein may automatically determine and adjust signal strength without a user's setting, thereby improving convenience of an installer, a manager, and a user.

Test signals may be exchanged and data may be received in response to a test signal reflected, and therefore, it may be possible to verify and determine a reliability of communication within a range where device-to-device communication is enabled, but not where communication among all devices in a predetermined space is enabled. Depending on operation of a unit or a device, a standby power regulating unit or a standby power regulator may flexibly change the strength of a wireless communication signal or a wireless signal and reduce the strength of transmitted power, thereby improving energy efficiency.

A communication distance may be determined with respect to a unit or device which actually performs communication, but not with respect to all devices which use the same wireless communication channel. Accordingly, if devices using different wireless channels or the same wireless channel are installed at a close distance, unnecessary wireless signal strength may be reduced, thereby reducing signal interference between the devices.

If a tuning process of the second unit is completed, the first unit may control another unit to perform a tuning process, and may repeat the above-described procedure from S710 to S730 until all units belonging to the same group complete a tuning process.

For example, the first unit may transmit the tuning command to a third unit belonging to the particular group, and the third unit may tune signal strength. The third unit may measure reception sensitivity and transmission and reception success rates of a wirelessly transmitted signal by communicating with units belonging to the particular group while reducing the signal strength of the signal from the default signal strength by one level at a time. If the reception sensitivity and the transmission and reception success rates measured by the third unit satisfy a predetermined standard at a certain level, the third unit may determine that a signal strength at a level right before that certain level is the signal strength to be used.

The third unit may perform the tuning process in the same manner as does the second unit, and, when the tuning process is completed, the third unit may notify the first unit of the completion of the tuning process. The third unit may transmit information related to the determined signal strength to the first unit. When the tuning process of the third unit is completed, the first unit may control another unit to perform a tuning process, and may repeat the above-described procedure from S710 to S730 until all units belonging to the same group complete a tuning process.

Embodiments disclosed herein may include a master unit or master device, such as an outdoor unit and a central controller, that transmits a tuning command to each slave unit of a plurality of slave units, such as an indoor unit, a sensor, and a remote controller, in a unicast manner or one at a time. The master unit may transmit the tuning command to a next or sequential slave unit when a signal indicative of completion of a tuning process is received sequentially from previous slave units.

A slave unit may exchange signals, one at a time, with other units existing in its communication range, and tune to optimal signal strength by measuring reception sensitivity and transmission and reception success rates of exchanged signals. For example, where default signal strength of a slave unit is 8 dBm, if a unit communicating with the slave unit exhibits reception sensitivity of −30 dBm and a transmission and reception success rate of 100%, the slave unit may perform a tuning process by reducing the signal strength until the reception sensitivity reaches −80 dBm and the transmission and reception success rate becomes 99.5% or more (if the transmission and reception success rate is equal to or smaller than 99.5%, the tuning process is completed in a previous stage). A slave unit having completed a tuning process may notify the master unit of a result of the tuning process, such as reception sensitivity and transmission and reception success rate.

Embodiments disclosed herein may reduce signal interference between devices or units installed in the same building or adjacent buildings by determining quality and reliability of communication due to presence of a surrounding obstacle, and by changing transmission power used in wireless communication. The air conditioner system disclosed herein may automatically set a strength of a wireless signal, regardless of a type of a wireless modulation method, such as Frequency Shift Keying (FSK), Gaussian Frequency Shift Keying (GFSK), Offset Quadrature Phase Shift Keying or Offset Quadriphase Shift Keying (OQPSK), Phase Shift Keying (PSK), and Orthogonal Frequency Division Multiplexing (OFDM).

Figure 8:
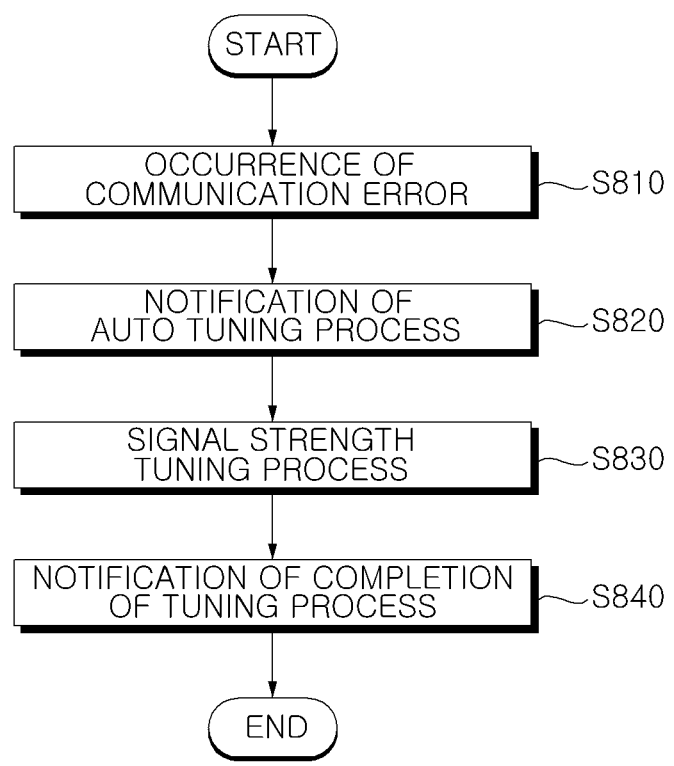
FIG. 8 is a flowchart illustrating a method for controlling an air conditioner system according to an embodiment.

FIG. 8 is a flowchart illustrating a method for controlling an air conditioner system according to an embodiment. The air conditioner system may include at least one outdoor unit 10 and a plurality of indoor units 20. An air conditioner system installed in a large building may include a plurality of outdoor units 10 and a plurality of indoor units 20. In this case, the plurality of indoor units 20 may be set as one group with one outdoor unit of the plurality of outdoor units 10 connected thereto via a refrigerant pipe.

As described above with reference to FIGS. 1 to 6, units or devices belonging to a particular group may wirelessly communicate with each other using a sub-GHz frequency band. The air conditioner system may further include other units or devices such as a controller 50, a wired or wireless remote controller 60, and a sensor 80, for example, in addition to indoor and outdoor units 20, 10. The air conditioner system may include a first unit, a second unit, a third unit, and a fourth unit among the plurality of devices belonging to a particular group.

Referring to FIG. 8, a communication error may occur in the fourth unit in S810. The communication error may include an error situation in which a wireless communication does not work, and may also include degradation of communication quality, which indicates that reception sensitivity and transmission and reception success rates of a signal are reduced to a predetermined level or lower.

While the units among the plurality of devices included in the air conditioner system may operate properly after completing a tuning process through the procedure described in FIG. 7, reception sensitivity and transmission and reception success rates of a signal may be reduced according to a change in a surrounding environment condition, such as communication interference from another product or device, addition of a wall or obstacle, or a degradation in quality of communication, for example, resulting in an occurrence of a communication error.

In this case, the fourth unit, which has a degraded quality of communication, may transmit a notification or start signal that notifies the start of a tuning process to the units belonging to the particular group in S820. Alternatively, a user may notify the air conditioner system to start a tuning process of the fourth unit. The fourth unit may broadcast the start signal a predetermined number of times. The fourth unit may notify nearby units or devices of the re-start of the tuning process in a broadcast manner, and adjust signal strength again.

The fourth unit may tune signal strength in S830. Tuning signal strength may include measuring reception sensitivity and transmission and reception success rates of a signal by changing signal strength of the wireless signal transmitted, and determining signal strength to be used in wireless communication based on the measurements.

For example, the fourth unit may measure reception sensitivity and transmission and reception success rates of a signal by communicating with units belonging to the particular group while increasing strength of the signal by one level at a time. The fourth unit may exchange signals with the other units in the particular group to determine reception sensitivity and a transmission and reception success rate.

In addition, if the reception sensitivity and the transmission and reception success rates, which are measured by the fourth unit, satisfy a predetermined standard, the fourth unit may determine that signal strength corresponding to a level right before a level satisfying the predetermined standard is the signal strength to be used.

The predetermined standard may be the case where the reception sensitivity and the transmission and reception success rates are greater than a reference value. The fourth unit may transmit a first signal having a signal strength greater than the current signal strength to the units belonging to the same group, and receive response signals from the unit to thereby measure reception sensitivity and the transmission and reception success rate of the signal.

If the measured reception sensitivity and the measured transmission and reception success rate are equal to or smaller than the reference value, the fourth unit may transmit a second signal having increased signal strength, receive response signals responsive to the second signal, and measure reception sensitivity and a transmission and reception success rate of the signal.

The fourth unit may increase signal strength of subsequent signals until the reception sensitivity and the transmission and reception success rate become greater than the reference value. The fourth unit may determine that the signal strength at which the reception sensitivity and the transmission and reception success rate are greater than the reference value is the signal strength to be used. This adjustment process may be a tune-up method. Alternatively, the fourth unit may determine that the second to last signal strength used, or the signal just before the signal resulting in reception sensitive and transmission and reception success rates greater than the reference value, is the signal to be used.

If the communication quality is degraded to a predetermined level or lower, it may be possible to increase signal strength by one level at a time until the communication quality reaches the predetermined level. By using signal strength at a level where the satisfied communication quality is achieved, it may be possible to adjust a wireless communication range of a corresponding unit to a minimum range where interference in wireless communication is minimized. In addition, an amount of power used in wireless communication may also be minimized.

The fourth unit may notify the first unit of completion of a tuning process in S840 when the tuning process is completed, as the signal strength to be used has been determined. The fourth unit may transmit information related to the determined signal strength to the first unit in S840. For example, the fourth unit may transmit information related to the second-level signal strength or the second to last signal strength, which may be determined to be the signal strength to be used, to the first unit.

For example, the information related to the determined signal strength may include data on the determined signal strength, data on reception sensitivity, and data on transmission and reception success rates. The fourth unit may notify nearby units or devices of completion of a tuning process in a broadcast manner.

The first unit may be an outdoor unit 10. Alternatively, the first unit may be a controller 50. For example, the first unit may be a central controller. In addition, the fourth unit may be an indoor unit 20, a remote controller 60, or a wireless sensor 80, for example.

Figure 9:
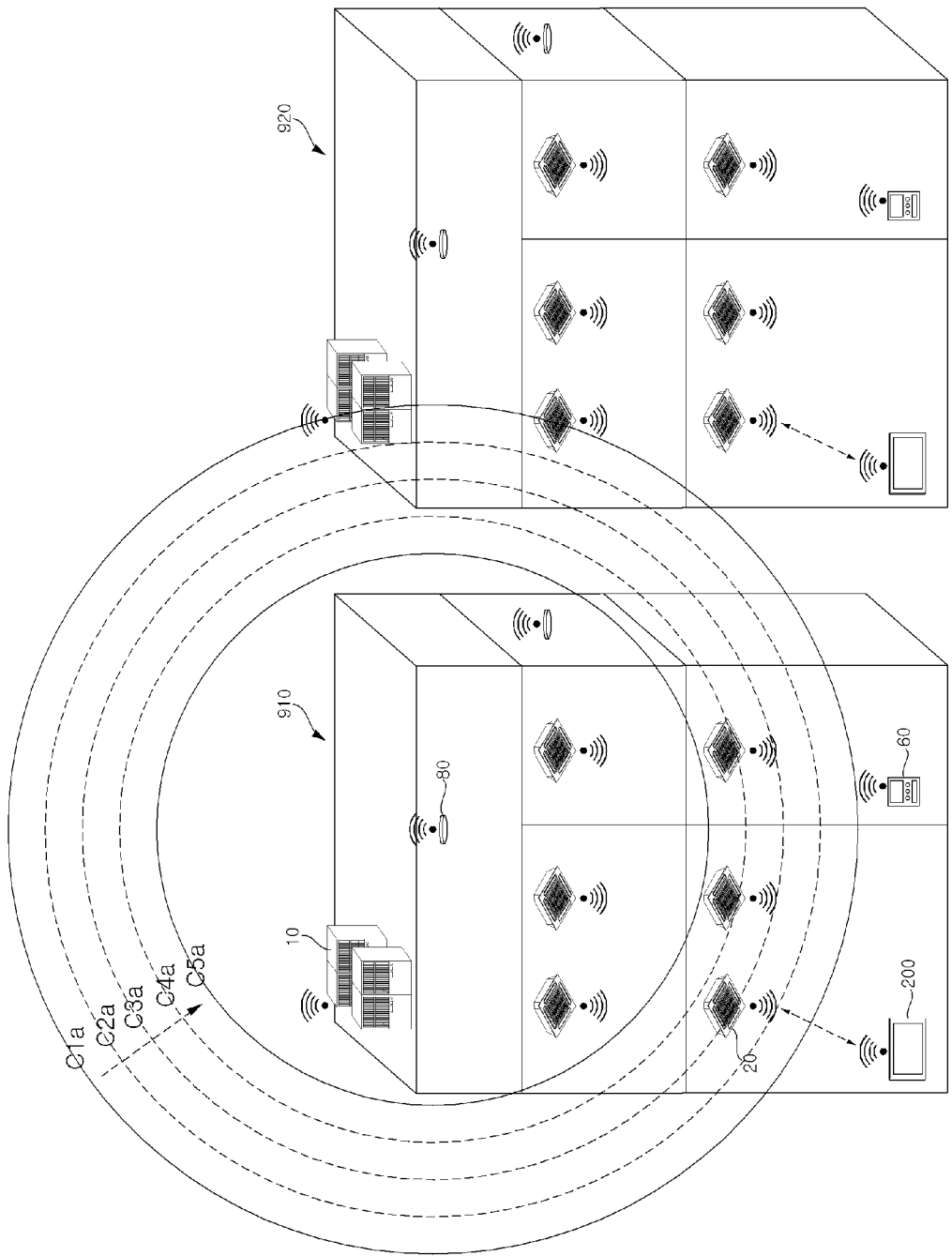
FIGS. 9 and 10 are diagrams illustrating a method for controlling an air conditioner system according to an embodiment.
Figure 10:
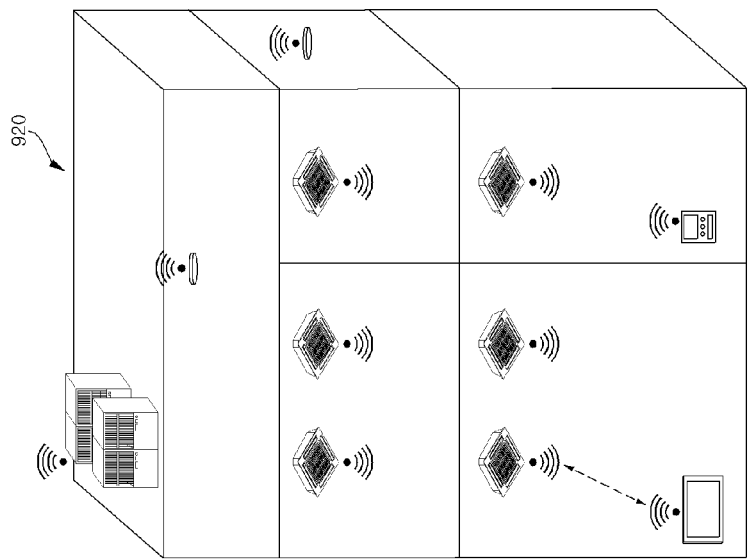
Figure 10:
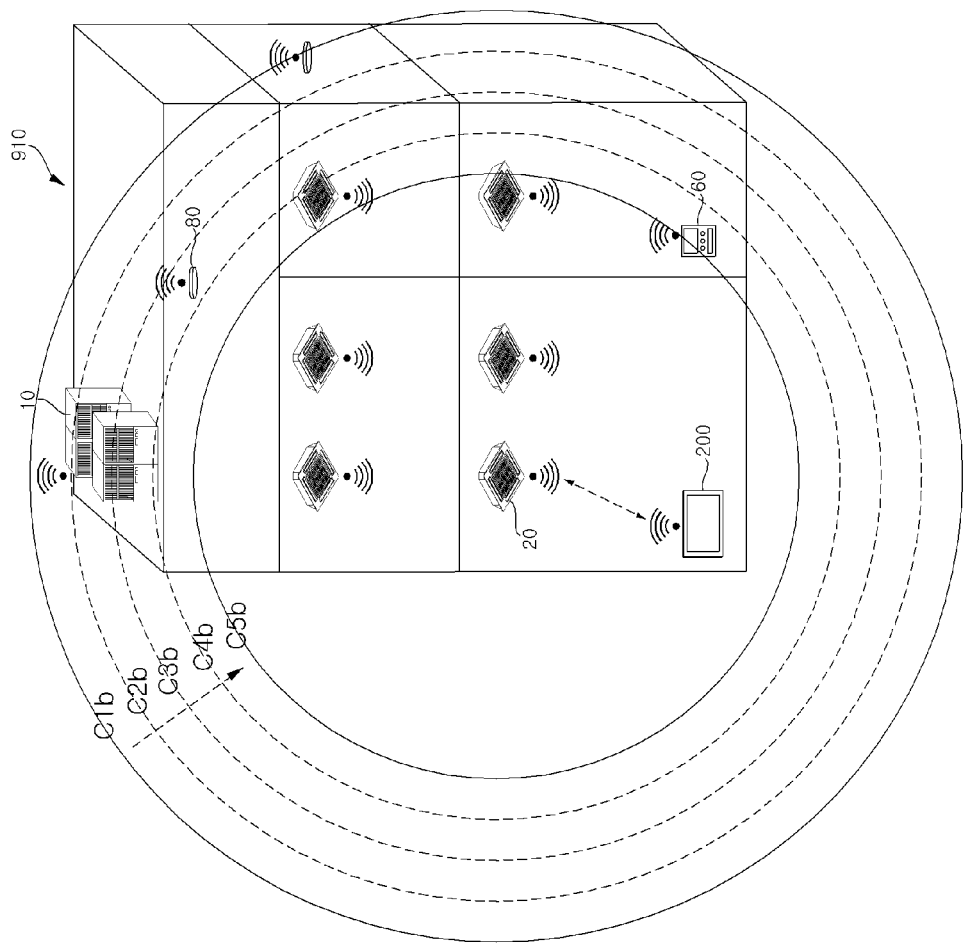

FIGS. 9 and 10 are diagrams explaining a method for controlling an air conditioner system according to an embodiment. FIGS. 9 and 10 are diagrams explaining a wireless signal auto tuning process or a tuning process. The tuning process may be performed after an initial communication network is constructed (after a determination that communication is working properly is made for every communication-required range.)

Referring to FIGS. 9 and 10, after an outdoor unit 10, indoor units 20, a sensor 80, or a remote controller 60, for example, are installed in a predetermined building 910 and a communication network is formed in a wireless communication-required range between units or devices, a tuning process may be performed.

After a communication connection is set up in a range between an outdoor unit 10 and a plurality of indoor units grouped with the outdoor unit 10 and in a range between a sensor 80 and the outdoor unit 10 or the indoor units 20, a tuning process may be performed. Alternatively, the tuning process may be performed when the quality of communication is degraded while a unit or device is in operation.

A master unit or master device may allocate a time to tune a strength of a wireless signal to each slave unit, and a corresponding slave unit may automatically tune optimal signal strength by reducing signal strength of a wireless signal by one level at a time during the allocated time. For example, the outdoor unit 10 may transmit a tuning command to the indoor units 20, the wireless sensor 80, the remote controller 60, and other units or devices in the group.

The outdoor unit 10 may transmit a tuning command to a particular unit, such as, for example, one of the indoor units in the plurality of indoor units 20. When completion of a tuning process is notified, the outdoor unit 10 may transmit a wireless tuning command to another unit. Accordingly, the outdoor unit 10 may control one unit at a time to perform a tuning process and may allocate a tuning time to each unit.

FIG. 9 shows an example in which the sensor 80 performs a tuning process. Referring to FIG. 9, the sensor 80 may check reliability of communication from default signal strength $C1a$, and reduce the signal strength by one level at a time. If reception sensitivity and a transmission and reception success rate based on the default signal strength $C1a$ are greater than a reference value, it may be determined that communication reliability is verified. In this case, the sensor 80 may measure the reception sensitivity and the transmission and reception success rate by gradually reducing the signal strength to $C2a$, $C3a$, $C4a$, and $C5a$. FIG. 9 is an example in which the signal intensities $C1a$, $C2a$, $C3a$, $C4a$, and $C5a$ are visually displayed in the form of a range of a wireless communication signal, but aspects of embodiments disclosed herein are not limited thereto.

If reception sensitivity and a transmission and reception success rate of a signal are reduced to the reference value or smaller when the signal is at a next-level signal strength which is smaller or weaker than a signal strength of a predetermined level $C5a$, the sensor 80 may determine that signal strength corresponding to $C5a$, which is a level right before a level at which the reception sensitivity and the transmission and reception success rate are reduced to the reference value or lower, is the signal strength to be used.

The sensor 80 may complete the tuning process when the signal strength to be used is determined, and may transmit information related to the determined signal strength to the outdoor unit 10. The outdoor unit 10 may then transmit the tuning command to another unit.

FIG. 10 shows an example in which an indoor unit of the plurality of indoor units 20 performs a tuning process. Referring to FIG. 10, the indoor unit 20 may check communication reliability from default signal strength $C1b$, and reduce the signal strength by one level at a time. Default signal strength $C1a$ or $C1b$ may be set to a different level depending on a type of a unit.

For example, great-level default signal strength, or a relatively strong signal strength, $C1b$ may be set for an indoor unit 20 required to communicate with an outdoor unit and another indoor unit, and thus, the indoor unit 20 may reduce the signal strength from $C1b$. The default signal strength $C1b$ may be determined depending on a required wireless communication range. If reception sensitivity and a transmission and reception success rate of a signal having the default signal strength $C1b$ are greater than the reference value, it may be determined that communication reliability is verified.

In this case, the indoor unit 20 may measure the reception sensitivity and the transmission and reception success rate by gradually reducing the signal strength to $C2b$, $C3b$, $C4b$, and $C5b$. If reception sensitivity and a transmission and reception success rate of a signal are reduced to the reference value or smaller when the signal has signal strength of, for example, $C4b$, which is smaller or weaker than the signal strength of a predetermined level $C3b$, the indoor unit 20 may determine that the signal strength corresponding to $C3b$, which is a level right before $C4b$, or a level at which the reception sensitivity and the transmission and reception success rate are reduced to the reference value or smaller, is the signal strength to be used.

The indoor unit 20 may complete the tuning process when the signal strength to be used is determined, and transmit information related to the determined signal strength to the outdoor unit 10. The outdoor unit 10 may transmit a tuning command to another unit so that another unit performs a tuning process, and may repeat the above-described procedure until all units or devices belonging to the same group complete the tuning process.

The air conditioner system may operate as all units complete the tuning process, so there may be degradation of a quality of communication, for example, as reception sensitivity and a transmission and reception success rate are reduced or a communication error occurs according to a change in a surrounding environment condition, such as communication interference from another product or device or addition of a wall or obstacle. A particular unit whose communication quality is degraded may perform a tuning process while gradually increasing signal strength, thereby optimizing the signal strength again.

Take an example of the sensor 80 in FIG. 9. While the sensor 80 of FIG. 9 performs wireless communication with signal strength of a specific or predetermined level C5$a$, the communication quality may be degraded due to a change in environment. The sensor 80 may measure the quality of communication by increasing the signal strength from the predetermined level C5$a$ to C4$a$, C3$a$, C2$a$, and C1$a$ by one level at a time. If communication reliability is verified at a next level C4$a$, the sensor 80 may set signal strength of the next level C4$a$ as signal strength for use, and complete the tuning process.

Take an example of the indoor unit 20 in FIG. 10. While the indoor unit 20 performs wireless communication with signal strength of a predetermined or specific level C3$b$, the quality of communication may be degraded due to a change in environment.

The indoor unit 20 may measure the communication quality by increasing the signal strength from the predetermined level C3$b$ to C2$b$ and C1$b$ by one level at a time. If communication reliability is verified at a next level C2$b$, the sensor 80 may set signal strength of the next level C2$b$ as signal strength for use and complete the tuning process.

According to embodiments disclosed herein, when many devices are wirelessly connected in a building or an apartment, it is possible to minimize signal interference between devices installed in the same building 910 or an adjacent building 920 within limited frequency resources. According to embodiments disclosed herein, It is possible to set optimal signal strength at which mutual interference is prevented.

In addition, embodiments disclosed herein may create a high-quality wireless communication environment. Embodiments disclosed herein may provide an air conditioner system which allows units to wirelessly communicate directly with each other regardless of an installation environment, and a control method of the system.

An electronic device or unit, a mobile terminal, and an air conditioner system according to embodiments disclosed herein may not be limitedly applicable to the configurations and methods of the embodiments as described above. For example, all or some of the embodiments may be selectively combined to achieve various modifications.

A method of controlling the electronic device or unit, the mobile terminal, and the air conditioner system according to embodiments disclosed herein may be implemented as code that can be written on a computer-readable medium in which a program is recorded and thus read by a computer. The computer-readable medium may include all kinds of recording devices in which data is stored in a computer-readable manner. Examples of the computer-readable recording medium may include a read only memory (ROM), a random access memory (RAM), a compact disk read only memory (CD-ROM), a magnetic tape, a floppy disc, and an optical data storage device. In addition, the computer-readable medium may be implemented as a carrier wave such as, for example, data transmission over the Internet. Furthermore, the recording medium readable by a processor may be distributed over computer systems connected over a network, and the code readable by a processor may be stored and executed in a distributed manner.

While embodiments have been described in connection with what is presently considered to be practical embodiments, it is to be understood that the disclosure herein is not limited to the disclosed embodiments, but, on the contrary, is intended to cover various modifications and equivalent arrangements included within the spirit and scope of the appended claims.

Embodiments disclosed herein provide an air conditioner system capable of setting optimal signal strength at which mutual interference is prevented, and a control method thereof. Embodiments disclosed herein may provide an air conditioner system capable of implementing a high-quality wireless communication environment, and a control method thereof. Embodiments disclosed herein may provide an air conditioner system in which each unit or device is capable of wirelessly communicating with one another, regardless of an installation environment, and a control method thereof.

The above and other objects can be accomplished by the provision of a control method of an air conditioner system, or a method of controlling an air conditioner system, the method including transmitting, by a first unit among a plurality of units belonging to a particular group, a wireless signal auto tuning command or a tuning command to a second unit; measuring, by the second unit, reception sensitivity and a transmission and reception success rate by wirelessly communicating with units belonging to the particular group while reducing signal strength from a default signal strength; when the reception sensitivity and the transmission and reception success rate satisfy a predetermined standard, determining, by the second unit, that signal strength corresponding to a level right before a level satisfying a predetermined standard is a signal strength for use; and transmitting, by the second unit, information related to the determined signal strength to be used to the first unit. Accordingly, it is possible to set optimal signal strength at which mutual interference is prevented.

The above and other objects can be accomplished by the provision of a control method of an air conditioner system or a method controlling an air conditioner system, the method including, when a communication error occurs in a fourth unit among a plurality of units belonging to a particular group, transmitting, by the fourth unit, a notification signal for notifying a wireless signal auto tuning process or a tuning process to other units belonging to the particular group; measuring, by the fourth unit, reception sensitivity and a transmission and reception success rate by wirelessly communicating with units belonging to the particular group while increasing signal strength by one level at a time; when the reception sensitivity and the transmission and reception success rate satisfy a predetermined standard, determining, by the fourth unit, that signal strength of a level satisfying the predetermined standard is the signal strength to be used; and transmitting, by the fourth unit, information related to the determined signal strength to be used to a first unit belonging to the particular group. Accordingly, it is possible to set optimal signal strength at which mutual interference is prevented.

According to embodiments disclosed herein, it is possible to set an optimal signal strength at which mutual interference is prevented. In addition, a high-quality wireless communication environment may be implemented. An air conditioner system in which each unit is able to wirelessly communicate with one another regardless of an installation environment, and a control method thereof may be provided. Other effects may be explicitly or implicitly disclosed in the description of the embodiments of embodiments disclosed herein.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an air conditioner system, the method comprising:
   transmitting, from a first unit among a plurality of units belonging to a particular group, a tuning command to a second unit;
   measuring a reception sensitivity and a transmission and reception success rate of the second unit by wirelessly communicating, using a signal strength of the second unit, with units among the plurality of units while reducing the signal strength of the second unit from a default signal strength of the second unit;
   when the measured reception sensitivity and the transmission and reception success rate of the second unit satisfy a predetermined standard, determining that a signal strength corresponding to a level immediately preceding a level that satisfies the predetermined standard is a signal strength to be used by the second unit; and
   transmitting to the first unit, from the second unit, information related to the determined signal strength of the second unit.

2. The method of claim 1, wherein the plurality of units belonging to the particular group perform wireless communication using a Sub-GHz frequency band.

3. The method of claim 1, wherein the first unit is an outdoor unit or a central controller.

4. The method of claim 1, wherein the second unit is an indoor unit, a remote controller, or a wireless sensor.

5. The method of claim 1, wherein the information related to the determined signal strength of the second unit comprises data on the determined signal strength of the second unit, data on the reception sensitivity of the second unit, and data on the transmission and reception success rate of the second unit.

6. The method of claim 1, further comprising:
   transmitting, from the first unit, the tuning command to a third unit among the plurality of units;
   measuring a reception sensitivity and a transmission and reception success rate of the third unit by wirelessly communicating, using a signal strength of the third unit, with units among the plurality of units while reducing the signal strength of the third unit from a default signal strength of the third unit by one level at a time;
   when the measured reception sensitivity and the transmission and reception success rate of the third unit satisfy a predetermined standard, determining, by the third unit, that a signal strength of the third unit corresponding to a level immediately preceding a level that satisfies the predetermined standard is the signal strength to be used by the third unit; and transmitting from the first unit, by the third unit, information related to the determined signal strength of the third unit.

7. The method of claim 1, wherein the predetermined standard indicates that one of the reception sensitivity and the transmission and reception success rate is equal to or smaller than a reference value.

8. The method of claim 1, wherein the default signal strength of the second unit is set to a different level depending on a type of unit the second unit is.

\* \* \* \* \*